US012674866B2

(12) United States Patent
Ho et al.

(10) Patent No.: US 12,674,866 B2
(45) Date of Patent: Jul. 7, 2026

(54) DETECTION AND CLASSIFICATION OF TRAFFIC SIGNS USING CAMERA-RADAR FUSION

(71) Applicant: Waymo LLC, Mountain View, CA (US)

(72) Inventors: Daniel Ho, Santa Clara, CA (US); Alper Ayvaci, San Jose, CA (US); Vasiliy Igorevich Karasev, San Francisco, CA (US); Jiakai Zhang, Fremont, CA (US)

(73) Assignee: Waymo LLC, Mountain View, CA (US)

( * ) Notice: Subject to any disclaimer, the term of this patent is extended or adjusted under 35 U.S.C. 154(b) by 47 days.

(21) Appl. No.: 18/541,508

(22) Filed: Dec. 15, 2023

(65) Prior Publication Data

US 2025/0199121 A1     Jun. 19, 2025

(51) Int. Cl.
*G01S 7/41*          (2006.01)
*B60W 60/00*          (2020.01)
*G01S 13/86*          (2006.01)

(52) U.S. Cl.
CPC ........... *G01S 7/417* (2013.01); *B60W 60/001* (2020.02); *G01S 13/867* (2013.01);
(Continued)

(58) Field of Classification Search
CPC  G06N 3/02; G06N 3/045; G06N 3/08; G06V 10/255; G06V 10/82; G06V 20/56; G06V 20/582; G06V 20/62; G01S 7/417; G01S 7/411; G01S 13/867; G01S 13/931;

B60W 60/001; B60W 2420/403; B60W 2420/408; B60W 2554/20; B60W 2555/60; B60W 2556/40; G05D 2111/60; G05D 2111/67
See application file for complete search history.

(56) References Cited

U.S. PATENT DOCUMENTS

| 11,105,924 | B2 | 8/2021 | Chen et al. |
| 11,774,582 | B2 * | 10/2023 | Song ...................... G01S 7/415 |
| | | | 342/70 |

(Continued)

FOREIGN PATENT DOCUMENTS

WO          2023158642 A1     8/2023

OTHER PUBLICATIONS

Extended European Search Report for European Application No. 24219776.2 mailed May 19, 2025, 12 Pages.

*Primary Examiner* — Brandon Z Willis
(74) *Attorney, Agent, or Firm* — Lowenstein Sandler LLP

(57)          ABSTRACT
The disclosed systems and techniques facilitate efficient detection and classification of traffic signs in driving environments. The disclosed techniques include, obtaining, using a sensing system of a vehicle a first set of perspective camera images of an environment and a second set of radar images of the environment. The techniques further include generating, using a first neural network, one or more camera features characterizing the first set of images, generating, using a second neural network, one or more radar features characterizing the second set of images, and processing the one or more camera features and the one or more radar features to obtain an identification of one or more traffic signs in the environment.

14 Claims, 9 Drawing Sheets

(52) U.S. Cl.
CPC . *B60W 2420/403* (2013.01); *B60W 2420/408*
(2024.01); *B60W 2555/60* (2020.02); *B60W*
*2556/40* (2020.02)

(56) References Cited

U.S. PATENT DOCUMENTS

| | | | |
|---|---|---|---|
| 2017/0206436 A1* | 7/2017 | Schiffmann | G01S 13/931 |
| 2020/0175315 A1* | 6/2020 | Gowaikar | G01S 13/89 |
| 2020/0192398 A1* | 6/2020 | Xu | G06T 7/90 |
| 2020/0286247 A1* | 9/2020 | Niesen | G06N 3/08 |
| 2020/0401823 A1* | 12/2020 | Miller | G01C 21/3811 |
| 2021/0166085 A1 | 6/2021 | Schlicht et al. | |
| 2022/0405517 A1* | 12/2022 | Shi | G06N 3/045 |
| 2023/0046274 A1 | 2/2023 | Chen et al. | |
| 2023/0260266 A1 | 8/2023 | Karasev et al. | |

* cited by examiner

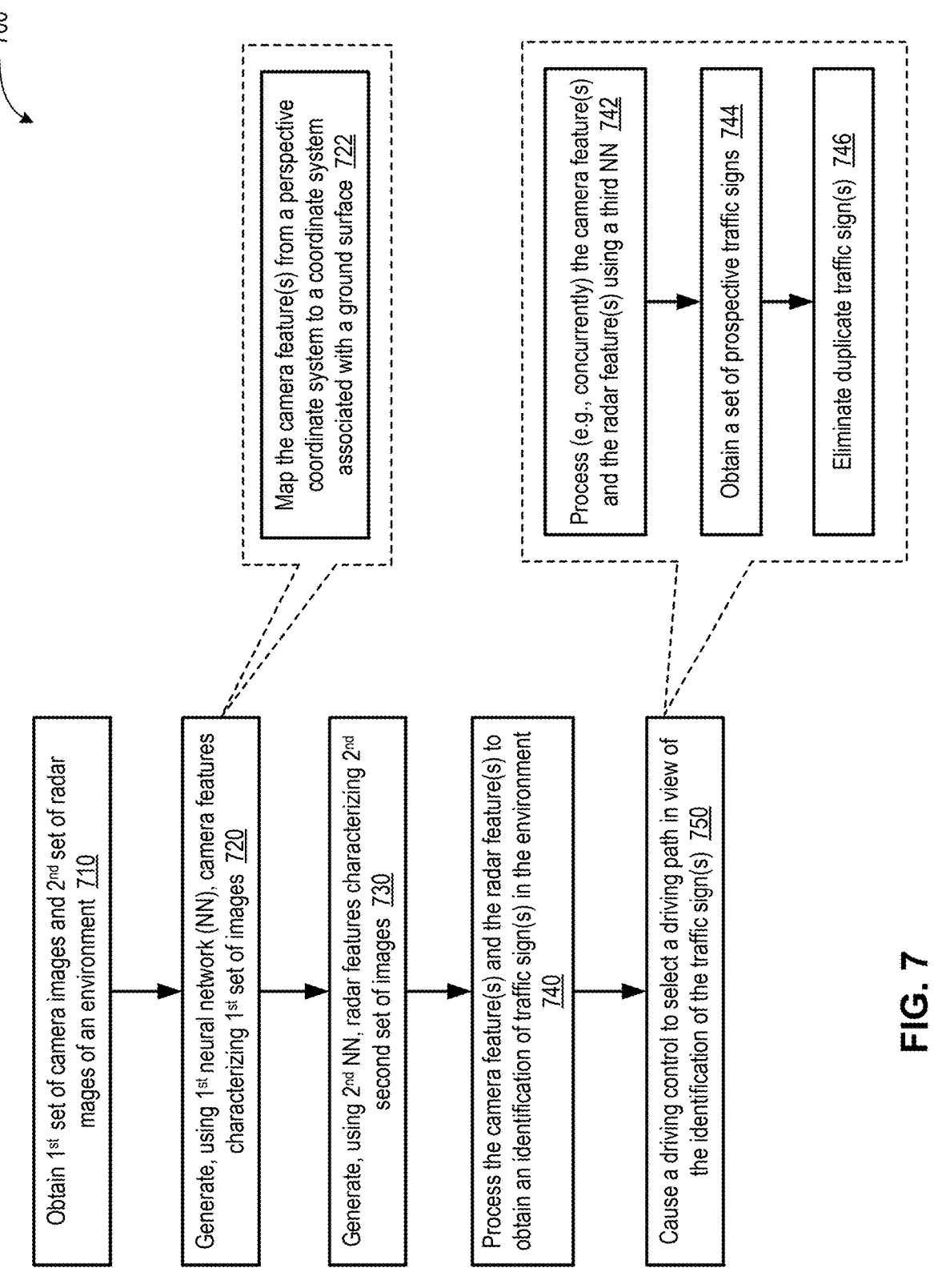

700

Obtain 1st set of camera images and 2nd set of radar images of an environment 710

Generate, using 1st neural network (NN), camera features characterizing 1st set of images 720

Map the camera feature(s) from a perspective coordinate system to a coordinate system associated with a ground surface 722

Generate, using 2nd NN, radar features characterizing 2nd second set of images 730

Process the camera feature(s) and the radar feature(s) to obtain an identification of traffic sign(s) in the environment 740

Process (e.g., concurrently) the camera feature(s) and the radar feature(s) using a third NN 742

Obtain a set of prospective traffic signs 744

Eliminate duplicate traffic sign(s) 746

Cause a driving control to select a driving path in view of the identification of the traffic sign(s) 750

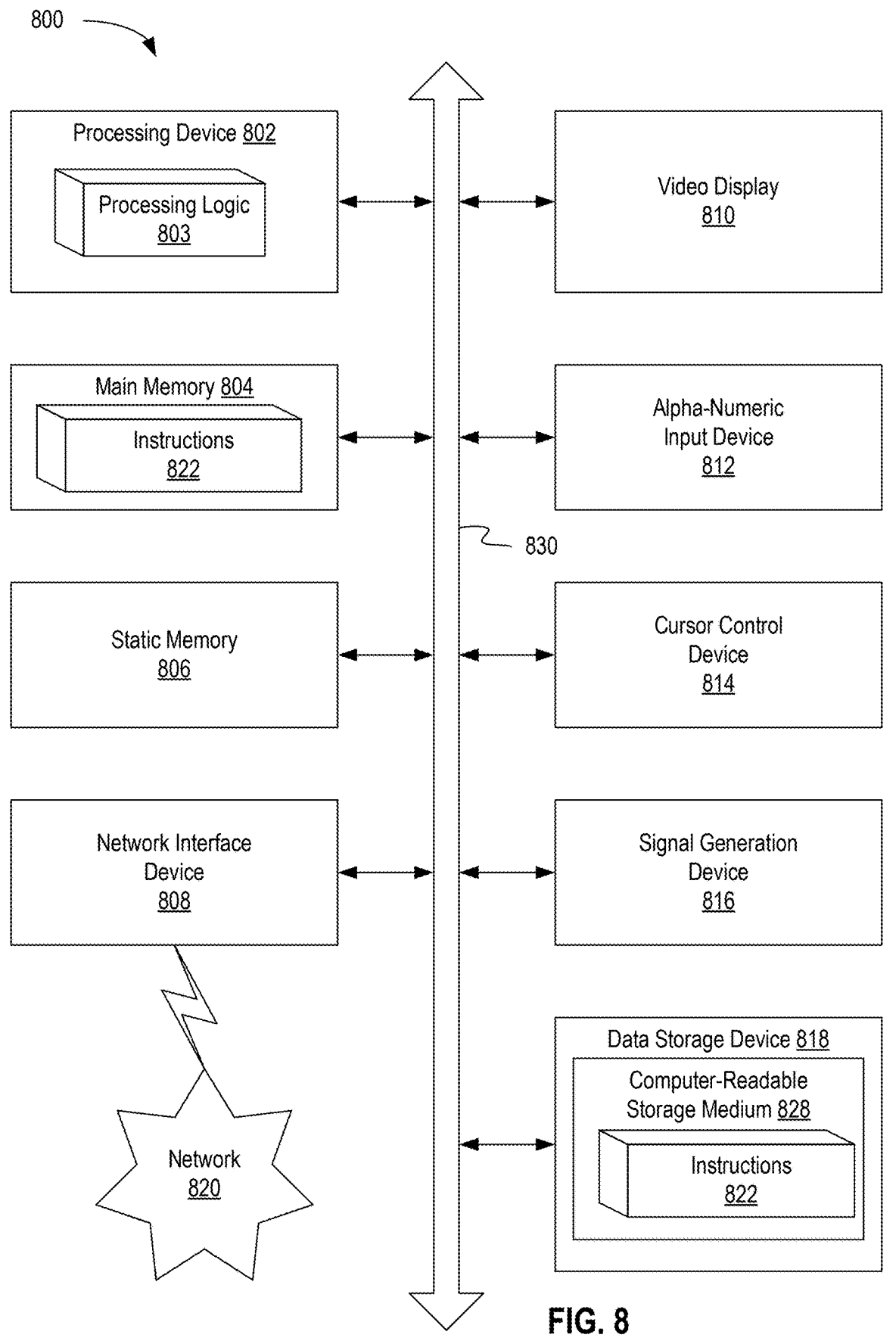

Processing Device 802

Processing Logic
803

Main Memory 804

Instructions
822

Static Memory
806

Network Interface
Device
808

Network
820

830

Video Display
810

Alpha-Numeric
Input Device
812

Cursor Control
Device
814

Signal Generation
Device
816

Data Storage Device 818

Computer-Readable
Storage Medium 828

Instructions
822

FIG. 8

DETECTION AND CLASSIFICATION OF TRAFFIC SIGNS USING CAMERA-RADAR FUSION

TECHNICAL FIELD

The instant specification generally relates to autonomous vehicles. More specifically, the instant specification relates to fast and accurate detection and classification of traffic signs in driving environments.

BACKGROUND

An autonomous (fully or partially self-driving) vehicle (AV) operates by sensing an outside environment with various electromagnetic (e.g., radar and optical) and non-electromagnetic (e.g., audio and humidity) sensors. Some autonomous vehicles chart a driving path through the environment based on the sensed data. The driving path can be determined based on Global Positioning System (GPS) data and road map data. While the GPS and the road map data can provide information about static aspects of the environment (buildings, street layouts, road closures, etc.), dynamic information (such as information about other vehicles, pedestrians, street lights, etc.) is obtained from contemporaneously collected sensing data. Precision and safety of the driving path and of the speed regime selected by the autonomous vehicle depend on timely and accurate identification of various objects present in the outside environment and on the ability of a driving algorithm to process the information about the environment and to provide correct instructions to the vehicle controls and the drivetrain.

BRIEF DESCRIPTION OF THE DRAWINGS

The present disclosure is illustrated by way of examples, and not by way of limitation, and can be more fully understood with references to the following detailed description when considered in connection with the figures, in which:

FIG. 3A illustrates a first portion of SDCM operations that includes individual processing of camera images and radar images. FIG. 3B illustrates a second portion of SDCM operations that includes processing of combined camera and radar features.

FIG. 7 illustrates an example method of deploying a sign detection and classification model that uses a combination of camera and radar images for accurate identification and reading of traffic signs in driving environments, in accordance with some implementations of the present disclosure.

FIG. 8 depicts a block diagram of an example computer device capable of a training and/or deploying a sign detection and classification model that uses a combination of camera and radar images for accurate identification and reading of traffic signs in driving environments, in accordance with some implementations of the present disclosure.

SUMMARY

Figure 1:
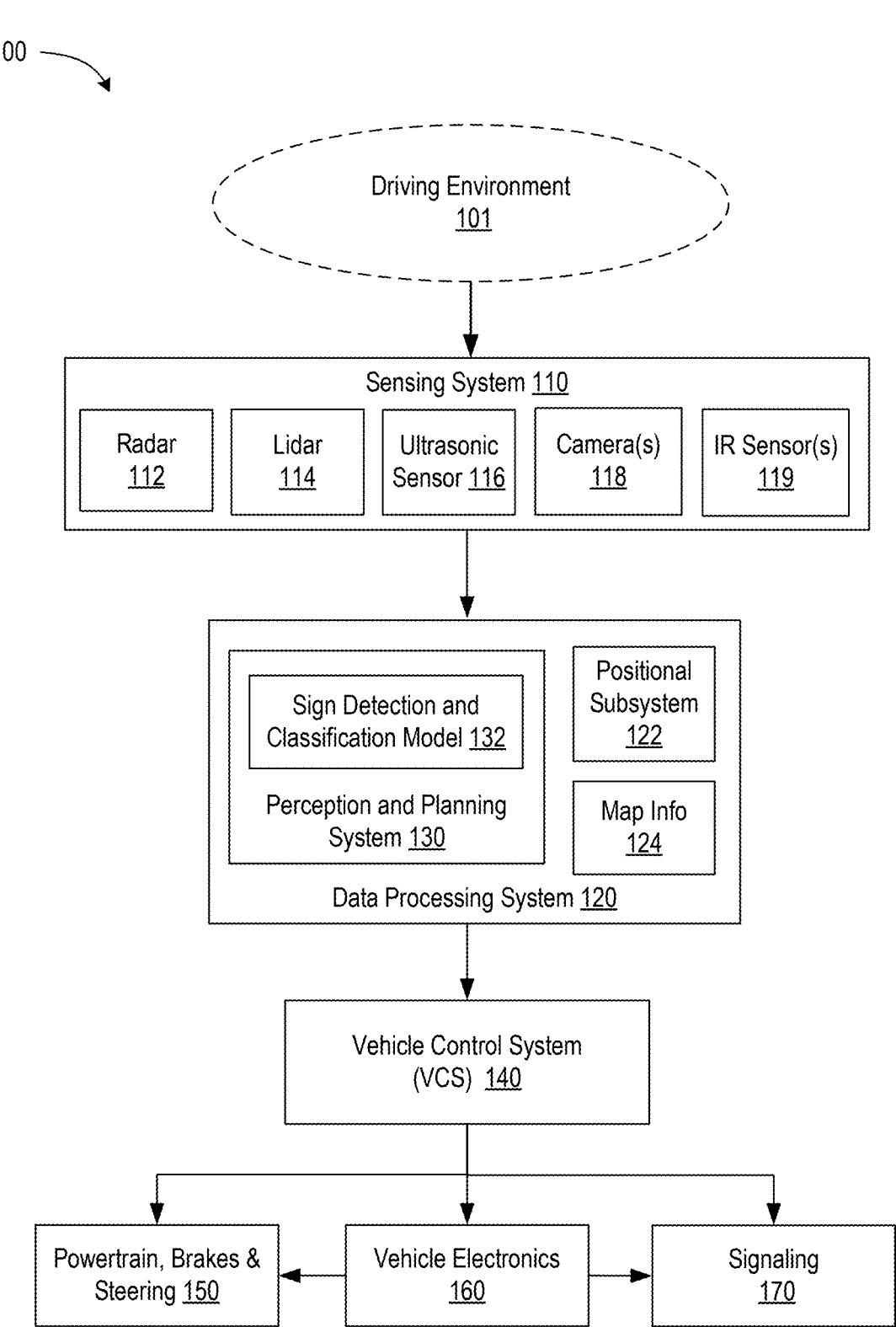
FIG. 1 is a diagram illustrating components of an example vehicle capable of deploying efficient sign detection and classification in driving environments, in accordance with some implementations of the present disclosure.

In one implementation, disclosed is a system that includes a sensing system of a vehicle and a data processing system. The sensing system is configured to acquire a set of camera images of an environment and a set of radar images of the environment. The data processing system is configured to generate, using a first neural network (NN), one or more camera features characterizing the set of camera images and generate, using a second NN, one or more radar features characterizing the set of radar images. The data processing system is further configured to process the one or more camera features and the one or more radar features to obtain an identification of one or more traffic signs in the environment.

In another implementation, disclosed is a method that includes obtaining, using a sensing system of a vehicle a set of camera images of an environment and a set of radar images of the environment. The method further includes generating, using a first NN, one or more camera features characterizing the set of camera images. The method further includes generating, using a second NN, one or more radar features characterizing the set of radar images. The method further includes processing the one or more camera features and the one or more radar features to obtain an identification of one or more traffic signs in the environment.

In yet another implementation, disclosed is an autonomous vehicle that includes one or more cameras configured to acquire a set of camera images of an environment and one or more radar sensors configured to acquire a set of radar images of the environment. The autonomous vehicle further includes a data processing system of the vehicle configured to generate, using a first NN, one or more camera features characterizing the set of camera images and generate, using a second NN, one or more radar features characterizing the set of radar images. The data processing system is further configured to process the one or more camera features and the one or more radar features to obtain an identification of one or more traffic signs in the environment. The autonomous vehicle further includes an autonomous vehicle control system configured to cause the autonomous vehicle to follow a driving path of selected in view of the identification of the one or more traffic signs.

DETAILED DESCRIPTION

An autonomous vehicle or a vehicle deploying various advanced driver-assistance features can use multiple sensor modalities to facilitate detection of objects in the outside environment and predict future trajectories of such objects. Sensors can include radio detection and ranging (radar)

sensors, light detection and ranging (lidar) sensors, digital cameras, ultrasonic sensors, positional sensors, and the like. Different types of sensors can provide different and complementary benefits. For example, radars and lidars emit electromagnetic signals (radio signals or optical signals) that reflect from the objects and carry back information about distances to the objects (e.g., determined from time of flight of the signals) and velocities of the objects (e.g., from the Doppler shift of the frequencies of the reflected signals). Radars and lidars can scan an entire 360-degree view by using a series of consecutive sensing frames. Sensing frames can include numerous reflections covering the outside environment in a dense grid of return points. Each return point can be associated with the distance to the corresponding reflecting object and a radial velocity (a component of the velocity along the line of sight) of the reflecting object.

Lidars, by virtue of their sub-micron optical wavelengths, have high spatial resolution, which allows obtaining many closely-spaced return points from the same object. This enables accurate detection and tracking of objects once the objects are within the reach of lidar sensors. Radar sensors are inexpensive, require less maintenance than lidar sensors, have a larger working range of distances, and have good tolerance of adverse weather conditions. Cameras (e.g., photographic or video cameras) capture two-dimensional projections of the three-dimensional outside space onto an image plane (or some other non-planar imaging surface) and can acquire high resolution images at both shorter distances and longer distances.

Various sensors of a vehicle's sensing system (e.g., lidars, radars, cameras, and/or other sensors, such as sonars) capture complementary depictions of objects in the environment of the vehicle. The vehicle's perception system identifies objects based on objects' appearance, state of motion, trajectory of the objects, and/or other properties. For example, lidars can accurately map a shape of one or more objects (using multiple return points) and can further determine distances to those objects and/or the objects' velocities. Cameras can obtain visual images of the objects. The perception system can map shapes and locations (obtained from lidar data) of various objects in the environment to their visual depictions (obtained from camera data) and perform a number of computer vision operations, such as segmenting (clustering) sensing data among individual objects (clusters), identifying types/makes/models/etc. of the individual objects, and/or the like. A prediction and planning system can track motion (including but not limited to locations and velocities) of various objects across multiple times and then extrapolate the previously observed motion into future. This predicted motion can be used by various vehicle control systems to select a driving path that takes these objects into account, e.g., avoids the objects, slows the vehicle down in the presence of the objects, and/or takes some other suitable actions.

In addition to detection of animate objects, the sensing system of a vehicle serves an important purpose of identifying various semantic information, such as markings on a road pavement (e.g., boundaries of driving lanes, locations of stop lines, etc.), traffic lights, and traffic signs, including new and temporary signs that are not present in a static (even regularly updated) road map information. Information communicated via traffic signs can be rather complex. For example, some signs can prescribe driving behavior to all road users (e.g., stop signs, no-entry signs, speed limit signs, and/or the like), some signs can regulate driving behavior of only a certain type of vehicles (e.g., trucks), of only vehicles positioned at certain driving lanes/streets/etc., or apply only at certain time(s) of day, and/or the like. Semantic meaning of traffic signs, however, can significantly depend not only on the content (picture) of a traffic sign but also on the location of the sign (e.g., in a multi-lane driving environment), the direction that the sign is facing), and/or the like. It is, therefore, important to accurately and timely detect both the content of a sign and the sign's location. Camera images can capture accurate depictions of signs. Such depictions can be used (e.g., by computer vision models) to identify a type of a sign (e.g., a speed limit sign) and a semantic meaning (value) of the sign (e.g., 40 mph speed limit). Camera images, however, are two-dimensional projections of the outside environment and do not include explicit depth (distance) information for depicted objects. Distance to objects can sometimes be estimated from the images and various metadata, e.g., a focal distance of the camera objective that captured the image. Such estimates, however, lead to significantly lower accuracy of distance determination than sensors equipped with ToF functionality, e.g., lidars and/or radars.

Lidars have a high imaging resolution, which can be comparable (for dense point clouds) to camera resolution and can potentially be used for detection and reading of traffic signs. For example, lidar return points can be used to determine an exact placement and shape of a sign. Additionally, intensity of lidar returns can be used to determine the content of the signs. For example, black portions of the sign may reflect lidar signals differently than white portions of the sign, allowing a computer vision system to read the text of the sign. Lidar sensors, however, are expensive and require complex maintenance. As a result, lidars are often not deployed with driver-assistance systems that do not provide full autonomous functionality (e.g., Level 2, 3, and 4 systems). Radars are much less expensive, require little maintenance, and are more likely to be deployed on such systems and vehicles. Radars include the ToF functionality and are capable of accurately determining distances to objects. Radars, however, have a much lower resolution than lidars, by virtue of a longer wavelength of electromagnetic signals. For example, a 24 GHz radar uses electromagnetic waves with the wavelength $\lambda \approx 1.25$ cm whose resolution at distances L=100 m is about $\Delta d \approx \sqrt{\lambda L} \approx 1$ m. Correspondingly, while a radar sensor can detect a reflection of a radar signal from an object (potential sign), the radar resolution may not be sufficient to read out the actual semantic content of the sign or determine a shape of the sign (e.g., to detect that the object is of an octagon shape indicative of a stop sign).

Aspects and implementations of the present disclosure address these and other challenges of the modern perception technology by enabling methods and systems that leverage camera and radar sensing modalities for efficient detection and classification of traffic signs. More specifically, each stream of images can be processed by a respective modality network, e.g., camera images can be processed by a camera network and radar images can be processed by a radar network. The radar network generates a set of radar features (feature vectors, embeddings) associated with specific coordinates x, y of a two-dimensional bird's eye view (BEV) grid, such that a radar feature $F_R(x, y; t)$ characterizes presence (or absence) of a reflecting object located at point x, y of the BEV grid at a given time t or the radar image capture. In some implementations, the radar images may be initially generated in polar (or spherical) coordinates, with the subsequent mapping performed to the grid (Cartesian) coordinates as part of a gather transformation that associates various points of the radar point cloud with specific locations within the BEV grid. Additionally, the radar feature can characterize a type of a reflection, e.g., distinguish a reflection from a metallic object (traffic signs, vehicles, etc.) from a reflection from non-metallic objects (e.g., trees, concrete structures, etc.). The coordinates of various reflecting points can be determined directly from radar data (e.g., distance and bearing towards the point of signal reflection). The camera network can similarly determine a camera feature $F_C(x, y; t)$ characterizing visual appearance of the portion of the environment associated with point x, y of the BEV grid at time t. Since camera images lack explicit distance (depth) information, the camera network can also (together with or after feature generation) perform a lift transform that associates various pixels of the camera images with points x, y of the BEV grid that are also associated with the radar returns. The lift transform can be performed by estimating the most likely distance associated with a given pixel in a camera image (e.g., distance to the object or a portion of the object depicted by the pixel) or evaluating a whole distribution of various such possible distances. Correspondingly, the camera network can map the camera features to the same BEV grid to which the radar network maps the radar features.

In some embodiments, the camera feature and the radar feature can then be aggregated into a joint feature, $\{F_R(x, y; t), F_C(x, y; t)\} \rightarrow F(x, y; t)$, that can be processed by another model, also referred to as a BEV model herein. The BEV model can include a backbone network that processes one or more joint features, e.g., a stack (tensor) of features corresponding to multiple times t. In some embodiments, the backbone network can feed or provide intermediate outputs to a number of classifier heads that output various classes for traffic signs captured by camera and radar images. For example, a sign detection head can classify various BEV points x, y as sign points or non-sign points and can generate bounding boxes for the identified signs in the original camera images. A sign type head can classify the detected signs among a number of predefined types, e.g., a speed limit sign, a stop sign, a yield sign, a lane sign (e.g., a lane merge sign, a lane turn sign, etc.), an informational sign (e.g., a highway exit sign), and/or any other type of a traffic sign, as can be specified during the model training. A relevancy head can classify the detected signs as relevant for the vehicle, e.g., a speed limit sign, a stop sign, etc., or as irrelevant for the vehicle, e.g., a sign directed to other types of vehicles (e.g., commercial trucks) or to vehicles occupying a different portion of the roadway (e.g., lane). Various additional classification heads can be trained, e.g., a sign value head that classifies speed limit signs among a number of sub-types (e.g., 20 mph sign, 65 mph sign, and/or the like).

In some embodiments, the sign detection and classification model can be an end-to-end (E2E) model with various networks of the model (e.g., camera network, radar network, backbone, classification heads, etc.) trained together, using a suitable ground truth data, which can include actual traffic sign labels (and values, where applicable), correct distance to the signs, association of the signs with specific lanes of travel, and/or the like. In one example, ground truth depth (distance) data can be measured using lidar sensors and correct sign type/value/associations can be determined by a human developer.

Operations of the sign detection and classification model can be periodically repeated, e.g., every second, several seconds, or a fraction of a second, to keep track of motion of the signs relative to the vehicle. In autonomous driving systems (or driving assist systems operating in an autonomous or a semi-autonomous mode), the detected and classified signs can be passed on to a planner module to chart and implement a driving path of the vehicle consistent with the traffic signs. In driver-assistance systems operating in driver-controlled modes, the detected and classified signs can be communicated to the driver, e.g., as part of displayed (dashboard) warnings, acoustic warnings, and/or the like.

Advantages of the described implementations include, but are not limited to, accurate, reliable, and fast detection and classification of without deployment of expensive lidar sensors while using complementary advantages of different sensing modalities. In particular, high-resolution but depth-uncertain camera images can be complemented by low-resolution but depth-cognizant radar data for more accurate monitoring of traffic signs of the driving environment. The E2E architecture of the disclosed sign detection and classification model enables fast sign perception. In turn, latency reduction in sign detection tasks leads to improved responsiveness in driving path selection and enhanced safety of driving operations. In some implementations, the disclosed techniques can be used to identify locations of traffic lights and their status together with traffic sign detection and classifications.

As used in the instant disclosure, a feature vector (an embedding) should be understood as any suitable digital representation of an input data, e.g., as a vector (string) of any number M of components, which can have integer values or floating-point values. Feature vectors can be considered as points in an M-dimensional embedding space. The dimensionality M of the embedding space (defined as part of any pertinent model architecture) can be smaller than the size of the input data (the audio frames). During training, a model learns to associate similar sets of training audio frames with similar feature vectors represented by points closely situated in the embedding space and further learns to associate dissimilar sets of training audio frames with points that are located farther apart in that space. In some implementations, a separate sound embedding (or a separate set of sound embeddings) can represent a given audio frame.

In those instances, where description of the implementations refers to autonomous vehicles, it should be understood that similar techniques can be used in various driver-assistance systems that do not rise to the level of fully autonomous driving systems. In some embodiments, disclosed techniques can be used in Level 2 driver-assistance systems that implement steering, braking, acceleration, lane centering, adaptive cruise control, etc., as well as other driver support. In some embodiments, the disclosed techniques can be used in Level 3 driving-assistance systems capable of autonomous driving under limited (e.g., highway) conditions. In such systems, fast and accurate detection and tracking of objects can be used to inform the driver of the approaching vehicles and/or other objects, with the driver making the ultimate driving decisions (e.g., in Level 2 systems), or to make certain driving decisions (e.g., in Level 3 systems), such as reducing speed, changing lanes, etc., without requesting driver's feedback.

FIG. 1 is a diagram illustrating components of an example vehicle 100 capable of deploying efficient sign detection and classification in driving environments, in accordance with some implementations of the present disclosure. Autonomous vehicles can include motor vehicles (cars, trucks, buses, motorcycles, all-terrain vehicles, recreational vehicles, any specialized farming or construction vehicles, and the like), aircraft (planes, helicopters, drones, and the like), naval vehicles (ships, boats, yachts, submarines, and the like), or any other self-propelled vehicles (e.g., robots, factory or warehouse robotic vehicles, sidewalk delivery robotic vehicles, etc.) capable of being operated in a self-driving mode (without a human input or with a reduced human input).

A driving environment 101 can include any objects (animate or inanimate) located outside vehicle 100, such as roadways, buildings, trees, bushes, sidewalks, bridges, mountains, other vehicles, pedestrians, and so on. The driving environment 101 can be urban, suburban, rural, and so on. In some implementations, the driving environment 101 can be an off-road environment (e.g., farming or other agricultural land). In some implementations, the driving environment can be an indoor environment, e.g., the environment of an industrial plant, a shipping warehouse, a hazardous area of a building, and so on. In some implementations, the driving environment 101 can be substantially flat, with various objects moving parallel to a surface (e.g., parallel to the ground). In other implementations, the driving environment can be three-dimensional and can include objects that are capable of moving along all three directions (e.g., balloons, leaves, etc.). Hereinafter, the term "driving environment" should be understood to include all environments in which an autonomous motion of self-propelled vehicles can occur. For example, "driving environment" can include any possible flying environment of an aircraft or a marine environment of a naval vessel. The objects of the driving environment 101 can be located at any distance from vehicle 100, from close distances of several feet (or less) to several miles (or more).

As described herein, in a semi-autonomous or partially autonomous driving mode, even though the vehicle assists with one or more driving operations (e.g., steering, braking and/or accelerating to perform lane centering, adaptive cruise control, advanced driver assistance systems (ADAS), or emergency braking), the human driver is expected to be situationally aware of the vehicle's surroundings and supervise the assisted driving operations. Here, even though the vehicle may perform all driving tasks in certain situations, the human driver is expected to be responsible for taking control as needed.

Although, for brevity and conciseness, various systems and methods may be described below in conjunction with autonomous vehicles, similar techniques can be used in various driver assistance systems that do not rise to the level of fully autonomous driving systems. In the United States, the Society of Automotive Engineers (SAE) have defined different levels of automated driving operations to indicate how much, or how little, a vehicle controls the driving, although different organizations, in the United States or in other countries, may categorize the levels differently. More specifically, disclosed systems and methods can be used in SAE Level 2 (L2) driver-assistance systems that implement steering, braking, acceleration, lane centering, adaptive cruise control, etc., as well as other driver support. The disclosed systems and methods can be used in SAE Level 3 (L3) driving-assistance systems capable of autonomous driving under limited (e.g., highway) conditions. Likewise, the disclosed systems and methods can be used in vehicles that use SAE Level 4 (L4) self-driving systems that operate autonomously under most regular driving situations and require only occasional attention of the human operator. In all such driving-assistance systems, accurate lane estimation can be performed automatically without a driver input or control (e.g., while the vehicle is in motion) and result in improved reliability of vehicle positioning and navigation and the overall safety of autonomous, semi-autonomous, and other driver assistance systems. As previously noted, in addition to the way in which SAE categorizes levels of automated driving operations, other organizations, in the United States or in other countries, may categorize levels of automated driving operations differently. Without limitation, the disclosed systems and methods herein can be used in driving assistance systems defined by these other organizations' levels of automated driving operations.

The example vehicle 100 can include a sensing system 110. The sensing system 110 can include various electromagnetic (e.g., optical) and non-electromagnetic (e.g., acoustic) sensing subsystems and/or devices. The sensing system 110 can include a radar (or multiple radars) 112, which can be any system that utilizes radio or microwave frequency signals to sense objects within the driving environment 101 of the vehicle 100. The radar(s) 112 can be configured to sense both the spatial locations of the objects (including their spatial dimensions) and velocities of the objects (e.g., using the Doppler shift technology). Hereinafter, "velocity" refers to both how fast the object is moving (the speed of the object) as well as the direction of the object's motion. In some implementations, the sensing system 110 can include a lidar 114, which can be a laser-based unit capable of determining distances to the objects and velocities of the objects in the driving environment 101. Each of radar 112 and lidar 114 can include a coherent sensor, such as a frequency-modulated continuous-wave (FMCW) lidar or radar sensor. For example, radar 112 can use heterodyne detection for velocity determination. In some implementations, the functionality of a ToF and coherent radar is combined into a radar unit capable of simultaneously determining both the distance to and the radial velocity of the reflecting object. Such a unit can be configured to operate in an incoherent sensing mode (ToF mode) and/or a coherent sensing mode (e.g., a mode that uses heterodyne detection) or both modes at the same time. In some implementations, multiple radars 112 or lidars 114 can be mounted on vehicle 100.

Lidar 114 can include one or more light sources producing and emitting signals and one or more detectors of the signals reflected back from the objects. In some implementations, lidar 114 can perform a 360-degree scanning in a horizontal direction. In some implementations, lidar 114 can be capable of spatial scanning along both the horizontal and vertical directions. In some implementations, the field of view can be up to 90 degrees in the vertical direction (e.g., with at least a part of the region above the horizon being scanned with radar signals). In some implementations, the field of view can be a full sphere (consisting of two hemispheres).

The sensing system 110 can further include one or more cameras 118 to capture images of the driving environment 101. The images can be two-dimensional projections of the driving environment 101 (or parts of the driving environment 101) onto a projecting surface (flat or non-flat) of the camera(s). Some of the cameras 118 of the sensing system 110 can be video cameras configured to capture a continuous (or quasi-continuous) stream of images of the driving environment 101. The sensing system 110 can also include one or more infrared (IR) sensors 119. The sensing system 110 can further include one or more ultrasonic sensors 116, which can be ultrasonic sonars, in some implementations.

The sensing data obtained by the sensing system 110 can be processed by a data processing system 120 of vehicle 100. For example, the data processing system 120 can include a perception and planning system 130. The perception and planning system 130 can be configured to detect and track objects in the driving environment 101 and to recognize the detected objects. For example, perception and planning system 130 can analyze images captured by the cameras 118 and can be capable of detecting traffic light signals, road signs, roadway layouts (e.g., boundaries of traffic lanes, topologies of intersections, designations of parking places, and so on), presence of obstacles, and the like. Perception system 130 can further receive radar sensing data (Doppler data and ToF data) and determine distances to various objects in the environment 101 and velocities (radial and, in some implementations, transverse, as described below) of such objects. In some implementations, perception and planning system 130 can use radar data in combination with the data captured by the camera(s) 118, as described in more detail below.

Perception and planning system 130 monitors how the driving environment 101 evolves with time, e.g., by keeping track of the locations and velocities of the animate objects (e.g., relative to Earth and/or the AV) and predicting how various objects are to move in the future, over a certain time horizon, e.g., 1-10 seconds or more. Perception and planning system 130 can include a sign detection and classification model (SDCM) 132 that performs E2E detection and reading of traffic signs present in the environment 101. SDCM 132 can include one or more trainable MLMs that can process data of multiple modalities, e.g., radar data and camera data.

Perception and planning system 130 can also receive information from a positioning subsystem 122, which can include a GPS transceiver and/or inertial measurement unit (IMU) (not shown in FIG. 1), configured to obtain information about the position of the AV relative to Earth and its surroundings. Positioning subsystem 122 can use the positioning data, e.g., GPS and IMU data) in conjunction with the sensing data to help accurately determine the location of vehicle 100 with respect to fixed objects of the driving environment 101 (e.g., roadways, lane boundaries, intersections, sidewalks, crosswalks, road signs, curbs, surrounding buildings, etc.) whose locations can be provided by map information 124. In some implementations, data processing system 120 can receive non-electromagnetic data, such as audio data (e.g., ultrasonic sensor data, or data from one or more microphones detecting emergency vehicle sirens), temperature sensor data, humidity sensor data, pressure sensor data, meteorological data (e.g., wind speed and direction, precipitation data), and the like.

The data generated by perception and planning system 130, positional subsystem 122, and/or the other systems and components of data processing system 120 can be used by an autonomous driving system, such as vehicle control system (VCS) 140. The VCS 140 can include one or more algorithms that control how vehicle 100 is to behave in various driving situations and environments. For example, the VCS 140 can include a navigation system for determining a global driving route to a destination point. The VCS 140 can also include a driving path selection system for selecting a particular path through the immediate driving environment, which can include selecting a traffic lane, negotiating a traffic congestion, choosing a place to make a U-turn, selecting a trajectory for a parking maneuver, and so on. The VCS 140 can also include an obstacle avoidance system for safe avoidance of various obstructions (rocks, stalled vehicles, a jaywalking pedestrian, and so on) within the driving environment of the AV. The obstacle avoidance system can be configured to evaluate the size of the obstacles and the trajectories of the obstacles (if obstacles are animated) and select an optimal driving strategy (e.g., braking, steering, accelerating, etc.) for avoiding the obstacles.

Algorithms and modules of VCS 140 can generate instructions for various systems and components of the vehicle, such as the powertrain, brakes, and steering 150, vehicle electronics 160, signaling 170, and other systems and components not explicitly shown in FIG. 1. The powertrain, brakes, and steering 150 can include an engine (internal combustion engine, electric engine, and so on), transmission, differentials, axles, wheels, steering mechanism, and other systems. The vehicle electronics 160 can include an on-board computer, engine management, ignition, communication systems, carputers, telematics, in-car entertainment systems, and other systems and components. The signaling 170 can include high and low headlights, stopping lights, turning and backing lights, horns and alarms, inside lighting system, dashboard notification system, passenger notification system, radio and wireless network transmission systems, and so on. Some of the instructions output by the VCS 140 can be delivered directly to the powertrain, brakes, and steering 150 (or signaling 170) whereas other instructions output by the VCS 140 are first delivered to the vehicle electronics 160, which generates commands to the powertrain, brakes, and steering 150 and/or signaling 170.

In one example, the VCS 140 can determine that an obstacle identified by the data processing system 120 is to be avoided by decelerating the vehicle until a safe speed is reached, followed by steering the vehicle around the obstacle. The VCS 140 can output instructions to the powertrain, brakes, and steering 150 (directly or via the vehicle electronics 160) to: (1) reduce, by modifying the throttle settings, a flow of fuel to the engine to decrease the engine rpm; (2) downshift, via an automatic transmission, the drivetrain into a lower gear; (3) engage a brake unit to reduce (while acting in concert with the engine and the transmission) the vehicle's speed until a safe speed is reached; and (4) perform, using a power steering mechanism, a steering maneuver until the obstacle is safely bypassed. Subsequently, the VCS 140 can output instructions to the powertrain, brakes, and steering 150 to resume the previous speed settings of the vehicle.

The "autonomous vehicle" can include motor vehicles (cars, trucks, buses, motorcycles, all-terrain vehicles, recreational vehicle, any specialized farming or construction vehicles, and the like), aircrafts (planes, helicopters, drones, and the like), naval vehicles (ships, boats, yachts, submarines, and the like), robotic vehicles (e.g., factory, warehouse, sidewalk delivery robots, etc.) or any other self-propelled vehicles capable of being operated in a self-driving mode (without a human input or with a reduced human input). "Objects" can include any entity, item, device, body, or article (animate or inanimate) located outside the autonomous vehicle, such as roadways, buildings, trees, bushes, sidewalks, bridges, mountains, other vehicles, piers, banks, landing strips, animals, birds, or other things.

Figure 2:
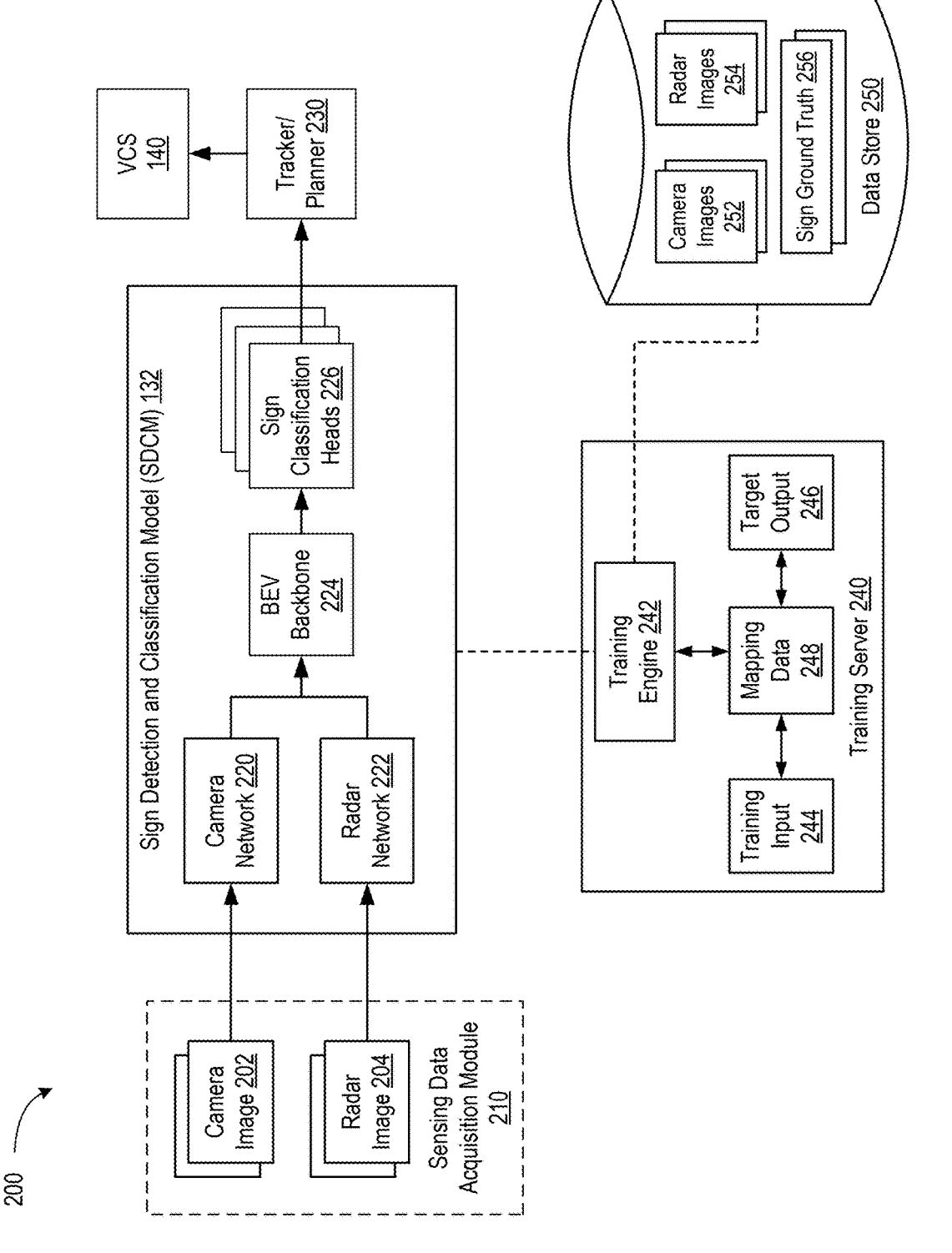
FIG. 2 is a diagram illustrating an example architecture that can be used for training and deployment of a sign detection and classification model capable of detection and reading of traffic signs in driving environments, in accordance with some implementations of the present disclosure.

FIG. 2 is a diagram illustrating an example architecture 200 that can be used for training and deployment of a sign detection and classification model capable of detection and reading of traffic signs in driving environments, in accordance with some implementations of the present disclosure. An input into SDCM 132 can include data obtained by sensing system 110 (e.g., by radar 112, camera(s) 118, and/or other sensors, with reference to FIG. 1). The obtained data can be provided via a sensing data acquisition module 210 that can decode, preprocess (e.g., denoise, up- or down-sample, etc.), reformat data to a format accessible to SDCM 132. In one example implementation, sensing data acquisition module 210 can obtain a sequence of camera images 202, e.g., two-dimensional projections of the driving environment (or a portion thereof) on an array of sensing detectors (e.g., charged coupled device or CCD detectors, complementary metal-oxide-semiconductor or CMOS detectors, and/or the like). Each camera image can have pixels of various intensities of one color (for black-and-white images) or multiple colors (for color images). The camera images can be panoramic images or images depicting a specific portion of the driving environment. The camera images can include a number of pixels. The number of pixels can depend on the resolution of the image. Each pixel can be characterized by one or more intensity values. A black-and-white pixel can be characterized by one intensity value, e.g., representing the brightness of the pixel, with value 1 corresponding to a white pixel and value 0 corresponding to a black pixel (or vice versa). The intensity value can assume continuous (or discretized) values between 0 and 1 (or between any other chosen limits, e.g., 0 and 255). Similarly, a color pixel can be represented by more than one intensity value, such as three intensity values (e.g., if the RGB color encoding scheme is used) or four intensity values (e.g., if the CMYK color encoding scheme is used). Camera images can be preprocessed, e.g., downscaled (with multiple pixel intensity values combined into a single pixel value), upsampled, filtered, denoised, and the like. Camera image(s) can be in any suitable digital format (JPEG, TIFF, GIG, BMP, CGM, SVG, and so on).

Sensing data acquisition module 210 can further obtain radar images 204, which can include a set of return points (point cloud) corresponding to radar beam reflections from various objects in the driving environment. Each return point can be understood as a data unit (pixel) that includes coordinates of reflecting surfaces, radial velocity data, intensity data, and/or the like. For example, sensing data acquisition module 210 can provide radar images 204 that include the radar intensity map I(R, θ, φ), where R, θ, φ is a set of spherical coordinates. In some implementations, Cartesian coordinates, elliptic coordinates, parabolic coordinates, or any other suitable coordinates can be used instead. The radar intensity map identifies an intensity of the radar reflections for various points in the field of view of the radar. The coordinates of objects that reflect radar signals can be determined from directional data (e.g., polar θ and azimuthal φ angles in the direction of lidar transmissions) and distance data (e.g., radial distance R determined from the time of flight of radar signals). Radar images 204 can further include velocity data of various reflecting objects identified based on detected Doppler shift of the reflected signals. In some implementations, sensing data acquisition module 210 can similarly obtain lidar images.

Camera images 202 and/or radar images 204 can be large images of the entire driving environment or images of smaller portions of the driving environment (e.g., camera image acquired by a forward-facing camera(s) of the sensing system 110). In some implementations, sensing data acquisition module 210 can crop camera images 202 and/or radar images 204 corresponding to a certain segment around a direction of motion of the vehicle. For example, since relevant traffic signs are typically located around the direction of travel of the vehicle, sensing data acquisition module 210 can crop camera images 202 and radar images 204 to within a forward-looking segment that is 200-250 m long and 20-40 m wide, in one example non-limiting implementation. The size of the segment can depend on the speed of the vehicle and a type of the driving environment and can be different for a highway driving environment than for an urban driving environment. Camera images 202 are processed by a camera network 220 and radar images 204 are processed by a radar network 222. Camera network 220 generates camera features (not shown in FIG. 2) and radar network 222 generates radar features (not shown in FIG. 2). The camera features and radar features can be associated with a two-dimensional bird's eye view (BEV) and can be generated using a suitable lift transform from perspective.

The camera features and the radar features can be combined and processed by a BEV model that includes a BEV backbone 224 and one or more sign classification heads 226. Sign classification heads 226 can identify traffic signs, determine bounding boxes for the identified signs, a degree of relevance of the identified signs, values (or other sign-specific content) of the signs, and/or the like. Various networks of SDCM 132 can include convolutional neural networks, recurrent neural networks (RNN) with one or more hidden layers, fully connected neural networks, long short-term memory neural networks, transformers, Boltzmann machines, and so on.

Output of SDCM 132 can be provided to tracker/planner 230, which can be a part of perception and planning system 130 of FIG. 1. Tracker/planner 230 can track motion (e.g., relative to the vehicle) of traffic signs, vehicles, and other objects. In some implementations, behavior of signs, vehicles, and other objects identified by SDCM 132 can be tracked using a suitable motion filter, e.g., Kalman filter. The Kalman filter computes a most probable geo-motion data in view of the measurements obtained (e.g., output of SDCM 132), predictions made according to a physical model of object's motion, and some statistical assumptions about measurement errors (e.g., covariance matrix of errors). Tracker/planner 230 can also select a path of the vehicle consistent with the identified traffic signs and provide instructions to vehicle control system 140 for implementation of the selected driving path.

Training of SDCM 132 and/or other MLMs can be performed by a training engine 242 hosted by a training server 240, which can be an outside server that deploys one or more processing devices, e.g., central processing units (CPUs), graphics processing units (GPUs), parallel processing units (PPUs), and/or the like. Training engine 242 can have access to a data store 250 storing various training data for training of SDCM 132. In some implementations, training data can include camera images 252 acquired during actual driving missions by onboard cameras and can further include radar images 254 associated with camera images 252, e.g., radar images of substantially the same regions of corresponding driving environments acquired at substantially the same time as the camera images. Training data stored by data store 250 can further include sign ground truth 256, which can include correct traffic sign classifications for images depicted in camera images 252 and radar images 254. For example, ground truth sign classifications can indicate presence (or absence) of signs within a particular region of the environment depicted by camera images 252 and radar images 254, types of the signs (e.g., speed limit sign, stop sign, yield sign, prohibiting sign, informational sign, and/or the like), semantic values of the signs (and/or any other variable information contained therein), portions of the roadway (e.g., lanes) affected by the signs. The ground truth sign classifications can further include correct distances to the signs. In some implementations, such ground truth distances can be measured using high-resolution lidar sensors. In some implementations, the ground truth distances can be determined by a developer manually mapping radar returns in radar images 254 to corresponding objects in camera images. In some implementations, the ground truth distances can be determined (with or without an input from a human developer) by matching depictions of traffic signs in camera images 254 to known (e.g., from map information and recorded vehicle's geo-motion data) locations of the traffic signs.

SDCM 132, as illustrated in FIG. 2, can be trained using training data that includes training inputs 244 and corresponding target outputs 246 (correct matches for the respective training inputs). During training, training engine 242 can retrieve training data from data store 250, prepare one or more training inputs 244 and one or more target outputs 246 (ground truth) and use the prepared inputs and outputs to train one or more models, including but not limited to SDCM 132. Training data can also include mapping data 248 that maps training inputs 244 to the target outputs 246. During training of SDCM 132, training engine 242 can cause SDCM 132 to learn patterns in the training data captured by training input/target output pairs. To evaluate differences between training outputs and target outputs 246, training engine 242 can use various suitable loss functions such as a mean squared error loss function (e.g., to evaluate departure from continuous ground truth values, e.g., distances to signs), binary cross-entropy loss function (e.g., to evaluate departures from binary classifications), and/or any other suitable loss function. In some implementations, SDCM 132 can be trained by training engine 242 and subsequently downloaded onto the perception and planning system 130 of the vehicle.

During training of SDCM 132, training engine 242 can change parameters (e.g., weights and biases) of the various networks of SDCM 132 until the model successfully learns to accurately detect traffic signs and read semantic content of the detected signs. In some implementations, more than one SDCM 132 can be trained for use under different conditions and for different driving environments, e.g., separate SDCMs 132 can be trained for street driving and for highway driving. Different trained SDCMs 132 can have different architectures (e.g., different numbers of neuron layers and/or different topologies of neural connections), different settings (e.g., types and parameters of activation functions, etc.), and can be trained using different sets of hyperparameters.

The data store 250 can be a persistent storage capable of storing radar images, camera images, as well as data structures configured to facilitate accurate and fast identification and validation of sign detections, in accordance with various implementations of the present disclosure. Data store 250 can be hosted by one or more storage devices, such as main memory, magnetic or optical storage disks, tapes, or hard drives, network-attached storage (NAS), storage area network (SAN), and so forth. Although depicted as separate from training server 240, in some implementations, the data store 250 can be a part of training server 240. In some implementations, data store 250 can be a network-attached file server, while in other implementations, data store 250 can be some other type of persistent storage such as an object-oriented database, a relational database, and so forth, that can be hosted by a server machine or one or more different machines accessible to the training server 240 via a network (not shown in FIG. 2).

Figure 3A:
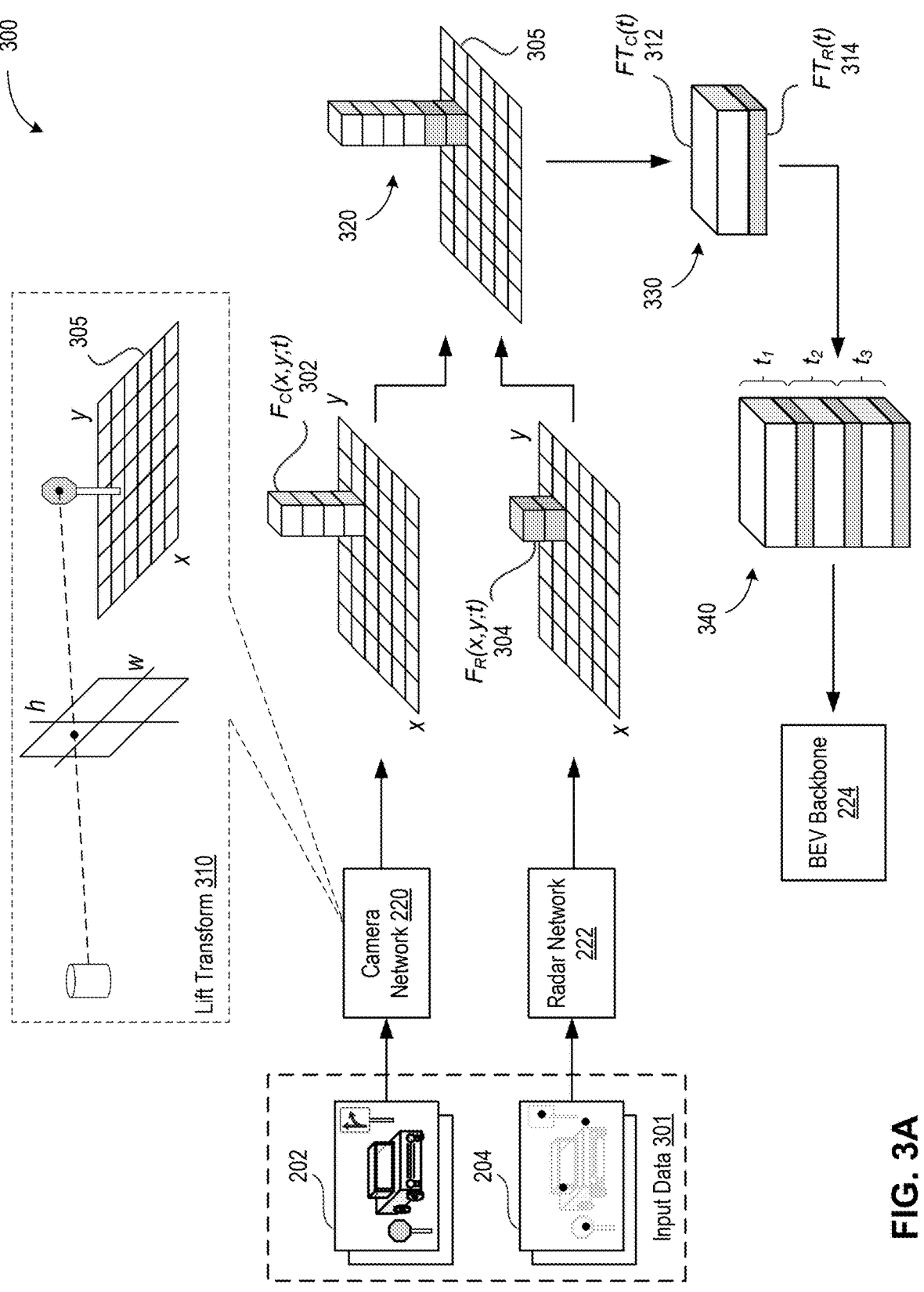
FIGS. 3A-3B illustrate example operations of a sign detection and classification model capable of efficient detection and reading of traffic signs in driving environments, in accordance with some implementations of the present disclosure.
Figure 3B:
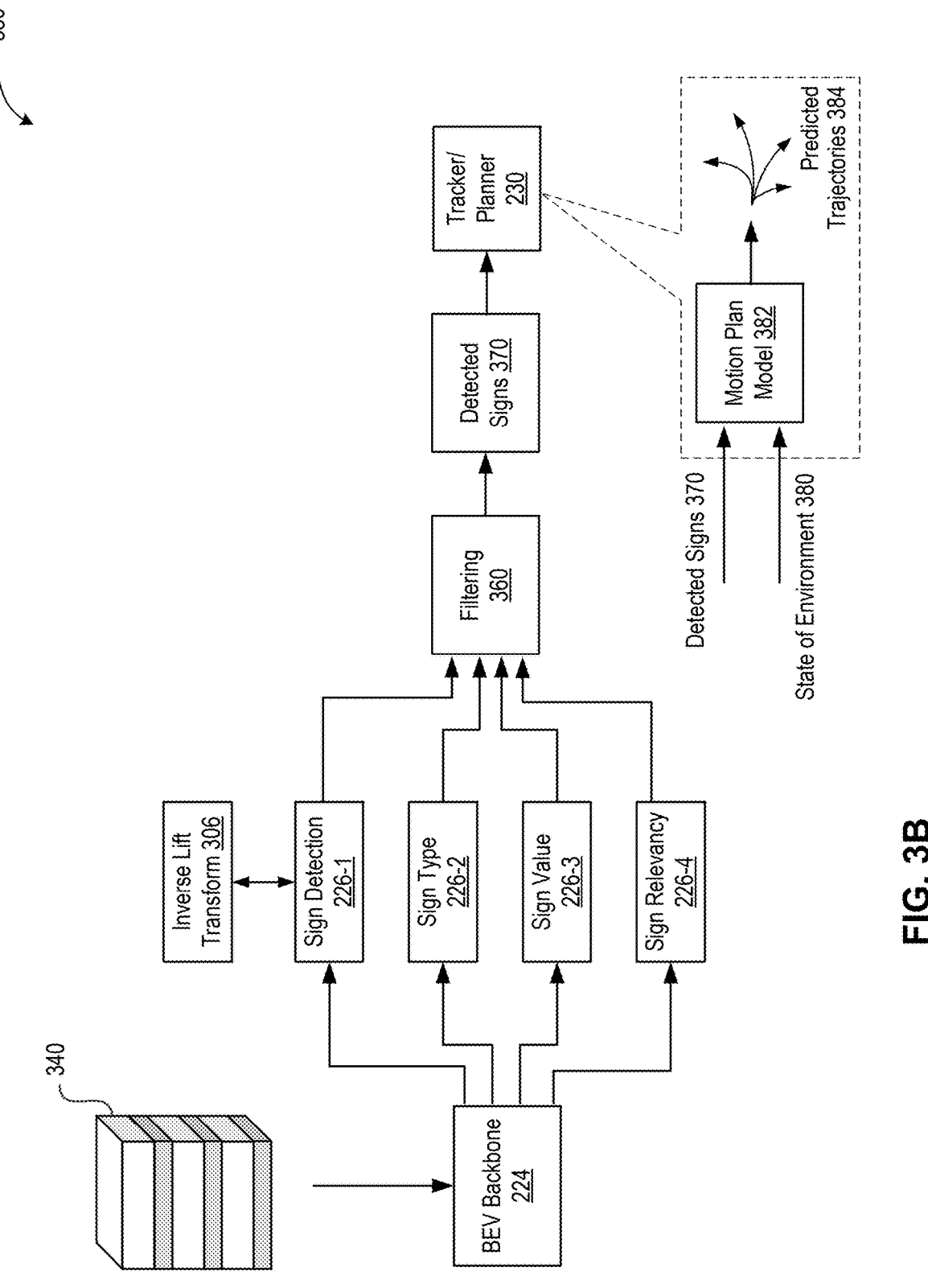

FIGS. 3A-3B illustrate example operations of a sign detection and classification model capable of efficient detection and reading traffic signs in driving environments, in accordance with some implementations of the present disclosure. FIG. 3A illustrates a first portion 300 of SDCM operations that includes individual processing of camera images and radar images. As shown in FIG. 3A, input data 301 into SDCM can include camera images 202 and radar images 204. Although for specificity, the description of FIG. 3A and FIG. 3B references radar images, in some implementations radar images 204 can be replaced with lidar images and the SDCM can be trained to perform sign detection/classification using lidar images instead of radar images. In some implementations, the lidar images can be processed in addition to radar images, e.g., using a separate lidar network to generate lidar features, not depicted in FIG. 3A.

Individual camera images 202 (and, similarly, radar images 204) can be associated with specific times $t_1$, $t_2$, $t_3$, . . . when the respective images were captured. Acquisition of camera images 202 and radar images 204 can be synchronized, so that the images of both modalities depict the driving environment at substantially the same times. Camera images 202 can be processed by camera network 220 and radar images 204 can be processed by radar network. In some implementations, each of the networks can process images associated with different times $t_j$ separately.

Camera network 220 and, similarly, radar network 222 can have any suitable architecture. In one example, camera network 220 and/or radar network 222 can be deep convolutional neural networks, e.g., with a U-net architecture that includes an encoder stage and a decoder stage. Each stage can have multiple convolutional neuron layers and one or more fully-connected layers. A convolutional encoder can include any number of filters (kernels) that broaden the perception field and identify features of the images by aggregating relevant information captured by individual units (pixels) of the images and encoding this information via features arranged in feature maps. Such feature maps can be produced using a sequence of convolutional layers and pooling (e.g., average pooling or maximum pooling) layers. A convolutional layer applies (usually multiple, e.g., tens, hundreds, or more) filters—limited-size matrices with learned weights—that scan across an image looking for certain features in the images. Different kernels can look for different features, e.g., boundaries of traffic signs, shapes of signs, color patterns of the signs, presence of texts in the signs, and/or the like. Kernels can be moved across images in steps (strides) that are smaller than the dimensions of kernels (e.g., a 5×5 pixel kernel can be shifted by 1, 2, 3 pixels during each step), forming a signal for neural activation functions. A subsampling (pooling) operation then reduces the dimension of the generated feature maps in accordance with a basic premise of the convolutional neural network architecture that information about the presence of a target feature is often more important than accurate knowledge of the feature's coordinates. As a result of such multi-layer convolutional-and-pooling processing, intermediate representations of the image grow along the feature (channel) dimension but shrink along the width-height dimension of the image. This reduction speeds up subsequent computations while simultaneously ensuring the neural network's capability to process input images of different scales.

A decoder portion of camera network 220 and/or radar network 222 upsamples the feature maps generated by the convolutional encoder to gradually increase resolution while reducing the feature/channel dimension (which can be performed using another set of learned deconvolutional kernels), e.g., back to the original (or somewhat reduced) dimensions of the input image with the final layer generating output features. For example, camera network 220 can generate camera feature vectors $F_C(x, y; t)$ 302 characterizing visual appearance (as captured by camera image 202) of the portion of the environment associated with point x, y of the BEV grid at time t. Similarly, radar network 222 can generate radar feature vectors $F_R(x, y; t)$ 304 characterizing presence or absence of a reflecting object (as captured by radar image 204) in the same portion of the environment associated with the same time t. Although, for the sake of illustration, a single camera feature vector $F_C(x, y; t)$ 302 (and, similarly, a single radar feature vector $F_R(x, y; t)$ 304) is depicted in FIG. 3A, individual feature vectors of can be combined into a camera feature tensor $FT_C(t)=\{F_C(x, y; t)\}$ 312. For those locales of the BEV grid where no indicia of traffic signs are detected, the respective camera feature vectors $F_C(x, y; t)$ 302 can have zero values (or values that are close to zero). Feature tensor $FT_C(t)$ 312 can have dimensions $X \times Y \times C$, where X and Y are dimensions of BEV grid 305 and C is a context dimension, which can be set (prior to training) as part of camera network 220 architecture. Similarly, radar feature vectors 304 are combined into a radar feature tensor $FT_R(t)=\{F_R(x, y; t)\}$ 314. Radar feature tensor $FT_R(t)$ 314 can have the same BEV dimensions X and Y and a context dimension $C_R$ that is different from the context dimension C of camera feature tensor $FT_C(t)$ 312. For example, context dimension $C_R$ of the camera feature vectors/tensor can have a higher dimension than the dimension $C_R$ of radar feature vectors/tensor given more diverse types of visual contexts that camera images 202 capture compared to radar images 204.

Although in the above example, convolutional encoder/deconvolutional decoder architecture is used as an illustration, camera network 220 and/or radar network 222 can have any other suitable architecture. For example, an encoder portion of the network(s) can include a recurrent neural network, a long-short term memory (LSTM) neural network, a fully-connected network, and/or some combination of such networks. In some implementations, camera network 220 and/or radar network 222 can have a transformer-based architecture with the encoder portion of the network(s) including one or more self-attention blocks and the decoder portion of the network(s) including one or more cross-attention blocks (in addition to self-attention blocks). In some implementations, camera network 220 and/or radar network 222 can include only an encoder portion while the decoder portion can be implemented as part of BEV backbone 224.

To generate camera feature vectors 302 (and camera feature tensor 312), camera network 220 can perform a lift transform 310 to compensate for the lack of explicit distance (depth) information in camera images 202. In some implementations, lift transform 310 can be performed in two stages. During a first stage, camera network 220 generates feature vectors $f(c)_{w,h}$ for pixels w, h of the camera (the perspective view), where c enumerates various context components (e.g., $c \in [1, C]$), and further supplements feature vectors $f(c)_{w,h}$ with depth information, which can be provided by separate outputs of camera network 220. For example, the depth information may include a distribution $P(d)_{w,h}$ of probabilities that a given pixel w, h depicts an object located at distance d from the camera. Lift transform 310 can then compute a direct product of each feature vector $f(c)_{w,h}$ with the corresponding depth distribution $P(d)_{w,h}$ to generate a depth-augmented feature vector $f(c, d)_{w,h}=f(c)_{w,h} \otimes P(d)_{w,h}$ for pixel w, h.

Depth-augmented feature vector $f(c, d)_{w,h}$ computed for individual pixels can then be combined (still in the perspective view) into a joint feature tensor for the whole image 202: $\{f(c, d)_{w,h}\} \rightarrow ft(c, d, w, h)$. The depth-augmented feature tensor $ft(c, d, w, h)$ has dimensions $C \times D \times W \times H$, where $W \times H$ is the dimension (in pixels) of camera image

202 and D is the dimension of the depth granularity. For example, distance d can be discretized among D of intervals, $\Delta d_1, \Delta d_2 \ldots \Delta d_D$. The intervals $\Delta d_i$ need not be of equal size, and can increase with the distance, e.g., $\Delta d_1 < \Delta d_D$. In some implementations, the last interval $\Delta d_D$ can extend from a certain distance (e.g., 100 m, 200 m, etc.) to infinite distances.

The second stage of lift transform 310 can include a two-dimensional (2D) mapping that maps the depth-augmented feature tensor to the feature tensor in BEV grid 305, e.g., in Cartesian coordinates, $ft(c, d, w, h) \rightarrow FT_C(c, x, y)$, or in any other set of plane coordinates, e.g., polar coordinates r and $\theta$ within the plane of the ground. More specifically, the perspective coordinates d, w, h can be transformed into 3D Cartesian coordinates d, w, $h \rightarrow x, y, z$ (or 3D cylindrical coordinates d, w, $h \rightarrow r, \theta, z$), with z being the vertical coordinate (in the direction perpendicular to the ground). The transformation d, w, $h \rightarrow x, y, z$ can be a projective transformation, parameterized with a focal length of the camera, direction of the optical axis of the camera, and other similar parameters. In the instances where camera images 202 are acquired by multiple cameras (or a camera with a rotating optical axis), the transformation d, w, $h \rightarrow x, y, z$ can include multiple projective transformations, e.g., with a separate transformation used for pixels w, h of different cameras (or by the same camera pointing in different directions).

The 2D mapping can be used to project the feature tensor expressed in the new coordinates, $ft(c, d, w, h) \rightarrow ft(c, x, y, z)$ and sum (or average, weight-average, or otherwise aggregate) over different heights z to obtain the feature tensor $FT_C(c, x, y)$ 312, e.g., $FT_C(c, x, y)=\Sigma_i ft(c, x, y, z_i)$. In some implementations, the summation over coordinates $z_i$ can be performed with different weights $w_i$ assigned to different coordinates $z_i$: $FT_C(c, x, y)=\Sigma_i W_i \cdot ft(c, x, y, z_i)$, e.g., with larger weights $w_i$ assigned to pixels that image objects within certain elevations from the ground (e.g., up to several meters) and lower weights assigned to other elevations (e.g., to eliminate spurious objects, such as tree branches, electric cables, etc., that do not obstruct motion of vehicles).

Similarly, the radar features outputted by the radar network 222 can be mapped to the same BEV grid 305. In the instance of radar network outputs, the distance to various reflecting pixels in radar image 204 can be accurately known (as part of radar data) so that the distribution P(d) can be the unity for a specific interval of distances $\Delta d_j$ and zero for other intervals. Lift transform 310 and the use of BEV grid 305 eliminates distortions associated with perspective view of the camera and radar sensors.

The camera features and the radar features can then be aggregated (e.g., concatenated) to obtain joint features. For example, feature vector aggregation can be performed for individual BEV grid locations x, y, to obtain joint feature vectors 320: $[F_C(x, y, t), F_R(x, y, t)] \rightarrow F(x, y, t)$. The set of joint feature vectors for various BEV grid locations represent a joint feature tensor $FT(t)=\{F(x, y; t)\}$ 330. Equivalently, the joint feature tensor $FT(t)$ 330 represents a combination $FT(t)=[FT_C(t), FT_R(t)]$ of the camera feature tensor 312 and the radar feature tensor 314.

In some implementations, joint feature tensors associated with multiple timestamps can be aggregated into a feature stack 340, e.g., $\{FT(t_1), FT(t_2), \ldots FT(t_M)\}$. (For brevity, the example case of M=3 is illustrated in FIG. 3A.) Times $t_1, t_2, \ldots t_M$ can be selected by applying a sliding window to images of input data 301. For example, during the next round of input data 301 processing by SDCM 132, feature stack 340 $\{FT(t_{1+S}), FT(t_{2+S}), \ldots FT(t_{M+S})\}$ associated with images acquired at times $t_{1+S}$, $t_{2+S}$, ... $t_{M+S}$ can be generated, with suitably chosen stride S, e.g., S=1,2, . . . etc. In some implementations, stride S can be set based on time of E2E processing of input data 301, e.g., to avoid idling of SDCM 132 while also preventing clogging of SDCM 132 due to new input data 301 being provided before a previous input data 301 has been converted into feature stack 340 and the feature stack 340 has been processed. For example, if typical time of E2E processing by SDCM 132 is τ, the stride can be set such that $t_{j+S}-t_j \approx \tau$.

Generated feature stack(s) 340 can be processed by BEV backbone 224. In some implementations, BEV backbone 224 can include both an encoder and a decoder. In some implementations, BEV backbone 224 can include a decoder whereas the encoders are implemented as part of camera network 220 and/or radar network 222.

FIG. 3B illustrates a second portion 350 of SDCM operations that includes processing of combined camera and radar features. BEV backbone 224 feeds intermediate outputs to a number of sign classification heads 226-n that output various classes for traffic signs captured by camera and radar images. Each classification head 226-n can output a different kind of information about traffic signs captured in input data 301. For example, sign detection head 226-1 can identify regions of the outside environment where signs are likely located. In some implementations, sign detection head 226-1 can classify various BEV points x, y as sign points or non-sign points, e.g., using a final binary (sigmoid) classifier that outputs floating-point probabilities $w_{sign}(x, y)$ and $w_{non-sign}(x, y) = 1 - w_{sign}(x, y)$ and then generates a binary prediction for the point x, y based on whether $w_{sign} > 0.5$ (or any other empirically set threshold, 0.5, 0.75, etc.). In some implementations, sign detection head 226-1 can use an inverse lift transform 306 to map BEV points x, y back to the perspective coordinates of the camera pixels w, h to generate bounding boxes for the identified signs within the camera images.

Sign type classification head 226-2 can classify the detected traffic signs among a number of predefined types, e.g., a speed limit sign, a stop sign, a yield sign, a lane direction sign (e.g., a lane merge sign, a lane turn sign, etc.), an informational sign (e.g., a highway exit sign), and/or any other type of a traffic sign, as can be defined during training of SDCM 132. For example, the final neuron layer of classification head 226-2 (e.g., a softmax layer) can output probabilities $w_1$, $w_2$, . . . $w_n$ for a sign to belong to any one of n defined types (classes). The type of the sign with the highest probability $w_{high}$ can then be outputted as the predicted sign type. The value of the corresponding probability can be used as a confidence level, e.g., with $w_{high} \geq 0.9$ corresponding to high confidence, $0.7 \leq w_{high} < 0.9$, and $w_{high} < 0.7$ corresponding to low confidence, in one illustrative non-limiting example.

Sign value classification head 226-3 can classify the detected traffic signs among a number of sign values (or any other sub-types), if such values are defined for the types identified by sign type classification head 226-2, e.g., "45 mph" value for the speed limit signs, "100 m" value for end-of-lane signs, and/or the like. Selection from a predetermined number of sign values can be performed similarly to selection from a number of sign types, e.g., as disclosed in conjunction with sign type classification head 226-2.

Sign relevancy classification head 226-4 can classify the detected signs as relevant for the vehicle performing the detection or as irrelevant for the vehicle, e.g., if the detected sign is directed to other types of vehicles (e.g., commercial trucks) or to vehicles occupying a different lane. The output of the sign relevancy classification head 226-4 can be obtained using a binary neuron classifier. The sign classification heads 226-n illustrated in FIG. 3B are intended to serve as an example, as various other classification heads can be defined and trained, depending on specific driving environments for the vehicle.

In some implementations, outputs of sign classification heads 226-n can undergo filtering 360 to eliminate duplicate signs, e.g., using non-maximal suppression (NMS), clustering, and/or other techniques. For example, NMS can be used to select the most probable bounding box in the instance of multiple (overlapping or non-overlapping) bounding boxes enclosing closely located spatial regions. NMS can include iteratively comparing probabilities of various bounding boxes and discarding one or more lower-probability bounding boxes at each iteration until the highest-probability bounding box is identified.

Filtering 360 can generate final detected signs 370 including locations and semantic information in the signs (e.g., sign types, sign values, relevancy, and/or the like). The detected signs 370 can be provided to tracker/planner module 380 that can track the motion of the detected signs with time relative to the vehicle, e.g., using a suitable motion tracker, such as Kalman filter. Tracker/planner module 230 can further make driving decisions in view of detected signs 370. For example, in autonomous driving systems (or driver-assistance systems operating in an autonomous or a semi-autonomous mode), tracker/planner module 230 can identify and implement a driving path of the vehicle consistent with placement and semantic information of detected signs 370. In driver-assistance systems, tracker/planner module 230 can provide a representation of the detected signs to a driver, e.g., via a dashboard display.

In one example implementation, as indicated with the blowout portion of FIG. 3B, detected signs 370 and a state of the environment 380 can be used as an input into a motion plan model 382 to generate one or more predicted trajectories 384 consistent with the traffic signs. State of the environment 380 can include location and state of motion (e.g., speed, direction, acceleration/braking, degree of steering, etc.) of the vehicle that deploys tracker/planner 230 and locations and states of motion of various objects in the environment, e.g., other vehicles, pedestrians, construction equipment, and/or the like. In some implementations, motion plan model 382 can include a transformer-based neural network trained to output predicted trajectories 384 of the vehicle in view of the traffic signs located within the visible portion of the environment.

In some implementations, predicted trajectories 384 can be represented via a number, e.g., n, of motion tokens determining a predicted state of motion of the vehicle at future times $t_1$, $t_2$, . . . $t_n$. In some implementations, the motion tokens can specify transitions between discrete states of motion. For example, the motion tokens can characterize an acceleration $\vec{a}(t_j)$ at time $t_j$ while a state of the vehicle can include the vehicle's location and velocity, $S(t_j) = \{\vec{x}(t_j), \vec{v}(t_j)\}$. The state $S(t_{j+1})$ of the vehicle at time $t_{j+1}$ can then be obtained by updating state $S(t_j)$ at time $t_j$, using the corresponding motion token $\vec{a}(t_j)$, e.g., as $S(t_j) \rightarrow S(t_{j+1}) = \{\vec{x}(t_j) + \vec{v}(t_j)(t_{j+1} - t_j) + \vec{a}(t_j)(t_{j+1} - t_j)^2/2, \quad \vec{v}(t_j) + \vec{a}(t_j)(t_{j+1} - t_j)\}$, in one example non-limiting implementation. The coordinate and velocity in the state of the vehicle and the acceleration in the token can be two-dimensional (or three-dimensional) vectors, e.g., with separate components along two (three) spatial dimensions. Tracker/planner 230 can then select a target trajectory from predicted trajectories 384 for implementation as a driving path of the vehicle, based on one or more target metrics, e.g., minimizing a time of travel, minimizing a number of stops, maximizing fuel economy, maintaining at least a minimum distance from the vehicle to other objects, and/or the like, or any combination thereof. Operations of motion plan model 382 can be repeated periodically after a certain time interval, e.g., 0.5 sec, 0.3 sec, and/or the like, with a new set of predicted trajectories 384 output and a new target trajectory selected.

The sign detection and classification model can be an end-to-end (E2E) model with various networks of the model—e.g., camera network 220, radar network 222, BEV backbone 224, and sign classification heads 226—trained together, using a suitable ground truth data, which can include actual traffic sign labels (and values, where applicable), correct distances to the signs, association of the signs with specific lanes of travel, and/or the like. In one example, ground truth depth (distance) data can be measured using lidar sensors and correct sign type/value/associations can be determined by a human developer.

In some implementations, some of the SDCM networks can be trained in stages, with camera network 220, BEV backbone 224, and sign classification heads 226 first pre-trained without an input from radar network 222, e.g., with corresponding neurons of the input layer of BEV backbone 224 receiving null inputs. Pre-training of camera network 220 can be performed using a suitable loss function that evaluates a difference between a center of the distribution $P(d)_{w,h}$ and the ground truth distance $d_{True}(w, h)$ for the respective training camera images. The difference can then be backpropagated through various layers of neurons of camera network 220 (BEV backbone 224) with camera network 220 learning to correctly predict probabilities of depths of pixels in camera depths with a target accuracy. Further training can include using outputs (radar feature tensors 314) of radar network 222 as inputs into BEV backbone 224. Such multi-stage training can teach the SDCM to more efficiently leverage camera images without overly relying on radar depth data.

Figure 4:
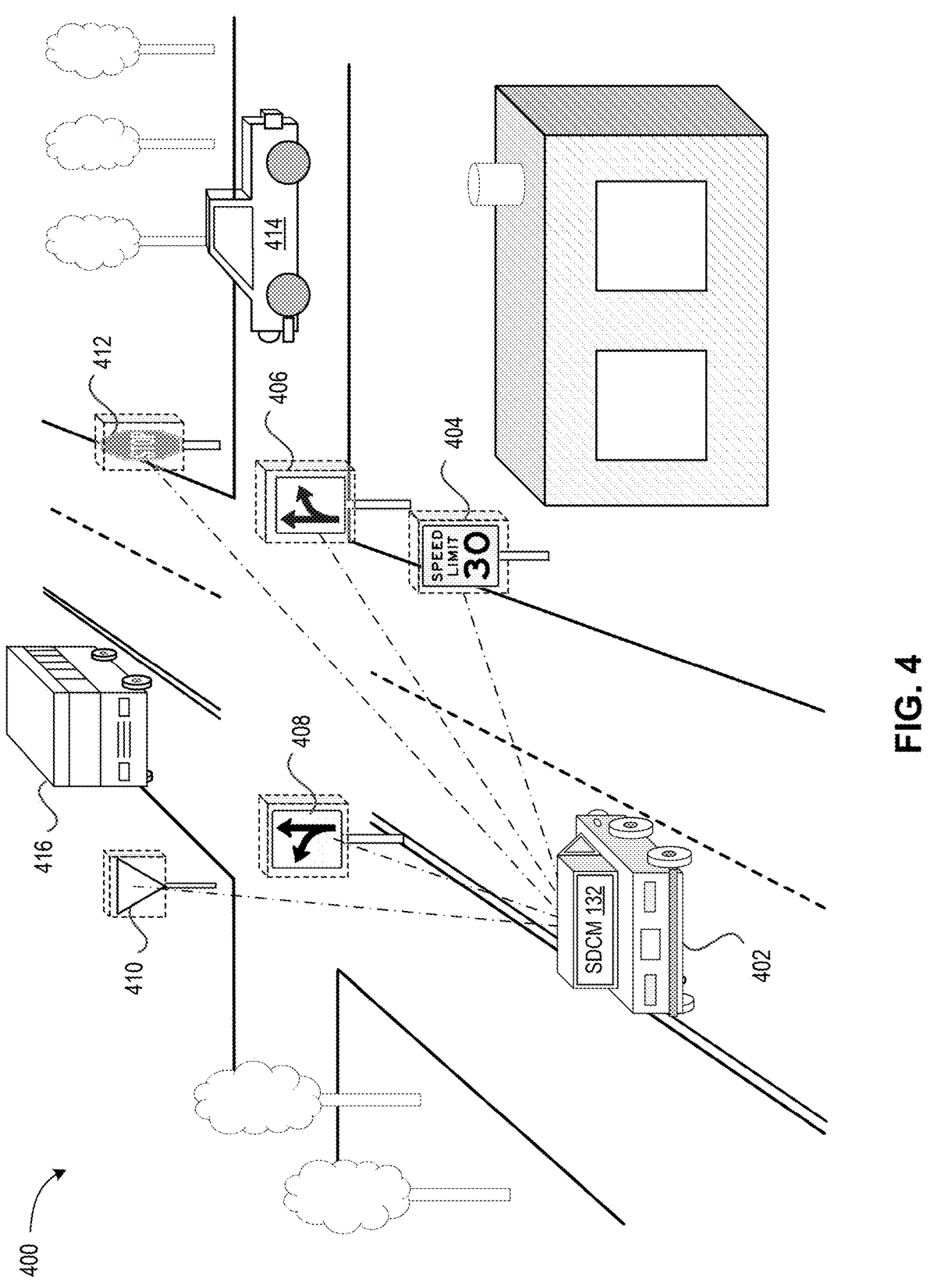
FIG. 4 is a schematic illustration of an example driving environment of a vehicle that deploys a sign detection and classification model for detection and reading of traffic signs, in accordance with some implementations of the present disclosure.

FIG. 4 is a schematic illustration of an example driving environment 400 of a vehicle 402 that deploys SDCM 132 for detection and reading of traffic signs, in accordance with some implementations of the present disclosure. As illustrated in FIG. 4, vehicle 402 is traveling in the left lane of a two-lane road and using camera sensors and radar sensors (not shown) to capture images of driving environment 400. The captured images can be processed by SDCM 132, e.g., as disclosed in conjunction with FIG. 3A and FIG. 3B. SDCM 132 can output one or more classifications of traffic signs detected in driving environment 400. For example, SDCM 132 can detect signs 404-412 and output the following example classifications for the signs.

Sign 404:
    Sign detection: Bounding Box
    Sign type: Speed Limit
    Sign value: 30 mph
    Sign relevancy: Yes
Sign 406:
    Sign detection: Bounding Box
    Sign type: Lane Directions
    Sign value: Straight and Right
    Sign relevancy: No
Sign 408:
    Sign detection: Bounding Box
    Sign type: Lane Directions
    Sign value: Straight and Left Sign relevancy: Yes
Sign 410:
    Sign detection: Bounding Box
    Sign type: Yield Sign
    Sign value: N/A
    Sign relevancy: No (Yes)
Sign 412:
    Sign detection: Bounding Box
    Sign type: Stop Sign
    Sign value: N/A
    Sign relevancy: No (Yes)

In these examples, "Bounding Box" may indicate both the dimensions of the sign enclosure and the direction that the sign is facing.

In the instances of stop signs 410 and/or 412, the sign relevancy can be defined differently depending on a specific implementation. For example, in one implementation, signs that are directed to other vehicles can be classified as irrelevant. In other implementations, some of the signs that are directed to other vehicles can still be classified as relevant. For example, stop signs 410 and/or 412 can affect motion of vehicle 402 indirectly, by causing other vehicles, e.g., light truck 414 and bus 416, to yield to vehicle 402.

Figure 5:
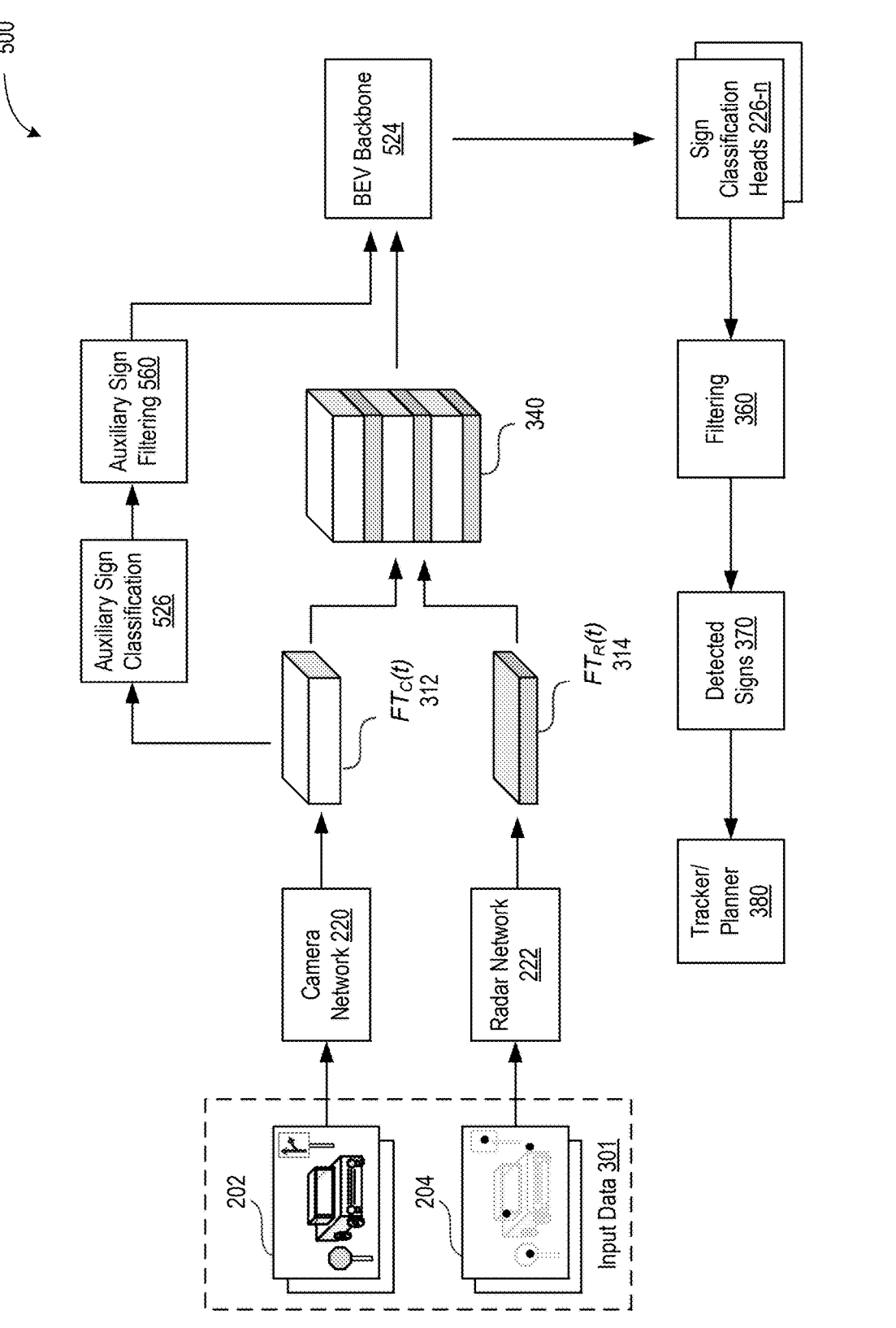
FIG. 5 illustrates an example architecture of a sign detection and classification model augmented with an additional branch of camera feature processing, in accordance with some implementations of the present disclosure.

FIG. 5 illustrates an example architecture 500 of a sign detection and classification model augmented with an additional branch of camera feature processing, in accordance with some implementations of the present disclosure. Processing of camera images 202 and radar images 204 can be performed similarly to the operations disclosed in conjunction with FIG. 3A, e.g., with camera network 220 generating camera feature tensor 314 (for various timestamps $t_j$) and radar network 222 generating radar feature tensor 314 (for various timestamps $t_j$). Camera feature tensor 312 can be combined (for multiple timestamps) with radar feature tensor 314 to form feature stack 340 that is then used as input into a BEV backbone 524.

The additional branch of camera feature processing can include an auxiliary sign classification model 526 that processes camera feature tensors 312 to perform preliminary detection of traffic signs that does not involve processing radar images 204 or data derived from radar images 204 (e.g., radar feature tensors 314). Auxiliary sign classification model 526 can include a decoder network and one or more classification heads (not explicitly shown in FIG. 5) that can implement any, some, or all functions of the sign classification heads 226-$n$, e.g., detection of bounding boxes and one or more sign characteristics, e.g., sign type, value, relevancy detection, and/or the like. In one example lightweight implementation, auxiliary sign classification model 526 can output bounding boxes for various hypothesized signs but not output other sign characteristics. Signs detected by auxiliary sign classification model 526 can be filtered by auxiliary sign filtering 560 to consolidate multiple detections of the same signs, e.g., using NMS, clustering, and/or other filtering techniques.

The detected (and filtered) signs and/or sign characteristics can then be used as an additional input into BEV backbone 524. BEV backbone 524 can have an architecture that is similar to architecture of BEV backbone 224 (as disclosed in conjunction with FIG. 3A), e.g., can include a convolutional decoder, transformer-based decoder, and/or the like, but can have a different number of neural nodes, including nodes of input neural layers and at least some hidden layers. In some implementations, BEV backbone 524 can have the same number of output neurons as BEV backbone 224, and the output of BEV backbone 524 can be provided to the sign classification heads 226-$n$ for further processing, e.g., as disclosed in conjunction with FIG. 3B. The outputs of auxiliary sign classification model 526 can be used to inform BEV backbone 524 of possible locations of traffic signs within camera images 202 and thus make sign detection and classification more efficient. Training of the SDCM of FIG. 5 can be performed using multiple training modes. More specifically, in a first training mode, the auxiliary branch can be turned on and in the second training mode the auxiliary branch can be turned off (e.g., by replacing inputs into BEV backbone 524 generated using auxiliary sign classification model 526 with null outputs). Such multi-mode training can train the SDCM to take advantage of preliminary outputs of auxiliary sign classification model 526 without developing undue reliance on such outputs (which can be imprecise without depth information derived from radar images 204).

Figure 6:
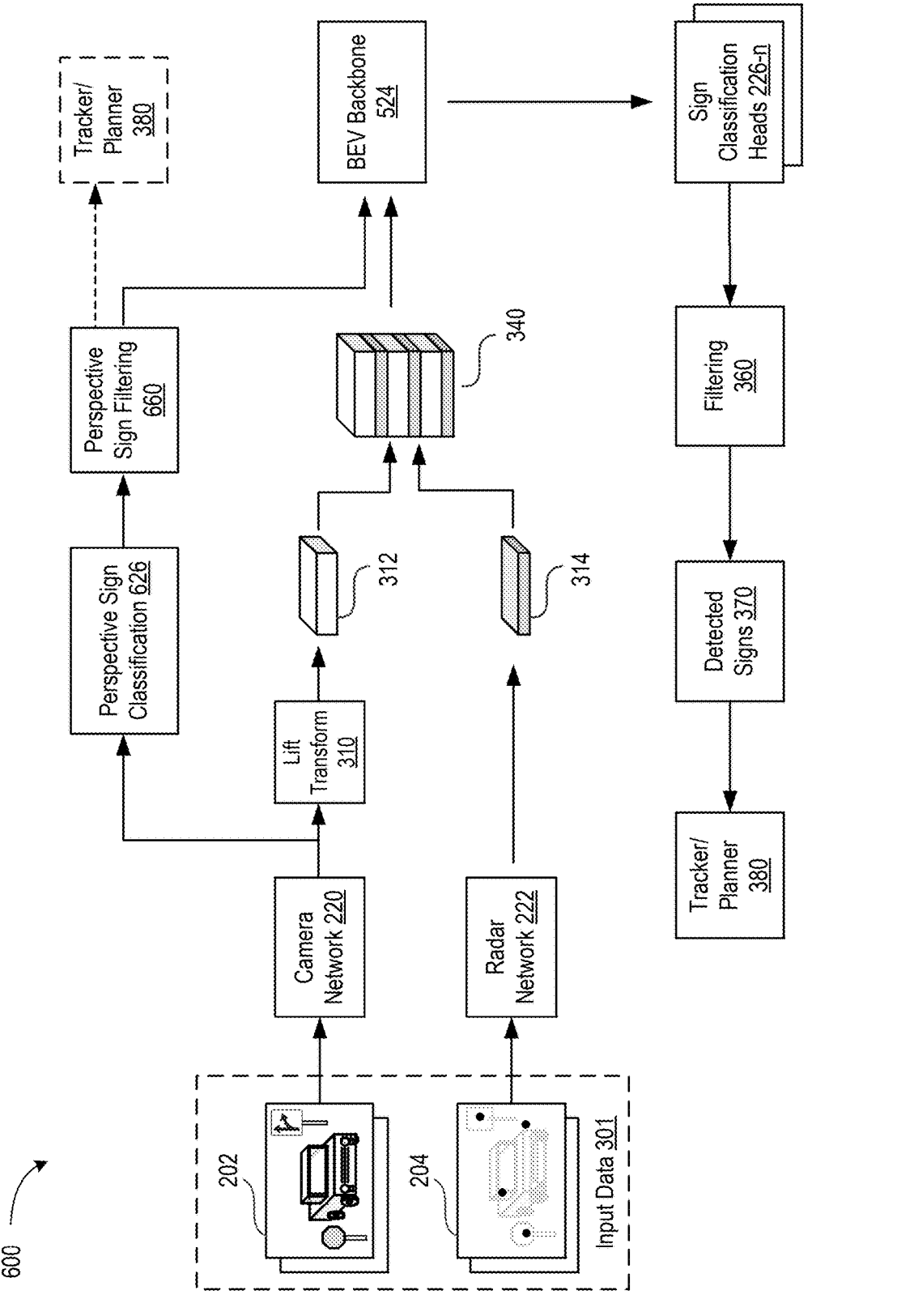
FIG. 6 illustrates another example architecture of a sign detection and classification model augmented with an additional branch of camera feature processing, in accordance with some implementations of the present disclosure.

FIG. 6 illustrates another example architecture 600 of a sign detection and classification model augmented with an additional branch of camera feature processing, in accordance with some implementations of the present disclosure. Example architecture 600 differs from example architecture 500 of FIG. 5 in that the input into the additional branch of camera feature processing is performed directly in the perspective representation, e.g., by perspective sign classification model 626 whose input includes a set of camera feature vectors in the perspective representation, prior to the operations of lift transform 310. In such implementations, the perspective sign classification model 626 can output 2D bounding boxes within camera images 202. Perspective sign filtering 660 may consolidate multiple bounding boxes associated with the same sign, e.g., as described above in conjunction with auxiliary sign filtering 560. Even though an implementation is shown in FIG. 6 in which the output of perspective sign classification model 626 is used as an input into BEV backbone 524, in other implementations, such outputs can be provided to tracker/planner 380 as freestanding outputs (as illustrated schematically with the dashed arrow in FIG. 6).

Although the techniques disclosed in conjunction to FIG. 3A, FIG. 3B, and FIG. 4-6 are described in reference to detection and classification of traffic signs, in some implementations, similar techniques can be used to identify locations and status (e.g., red, green, yellow, stop, go, etc.) of traffic lights. In such implementations, SDCM 132 and its various components, e.g., the camera model, the radar model, the BET backbone, and the classification heads, can be trained using images of traffic lights (and/or images of traffic lights and traffic signs) and an additional ground truth for the location and status of such traffic lights.

FIG. 7 illustrates an example method 700 of deploying a sign detection and classification model that uses a combination of camera and radar images for accurate identification and reading of traffic signs in driving environments, in accordance with some implementations of the present disclosure. A processing device, having one or more processing units (CPUs), one or more graphics processing units (GPUs), one or more parallel processing units (PPUs) and memory devices communicatively coupled to the CPU(s), GPU(s), and/or PPU(s) can perform method 700 and/or each of its individual functions, routines, subroutines, or operations. Method 700 can be directed to systems and components of a vehicle. In some implementations, the vehicle can be an autonomous vehicle. In some implementations, the vehicle can be a driver-operated vehicle equipped with driver-assistance systems, e.g., Level 2 or Level 3 driver assistance systems, that provide limited assistance with specific vehicle systems (e.g., steering, braking, acceleration, etc. systems) or under limited driving conditions (e.g., highway driving). The processing device executing method 700 can perform instructions issued by the perception and planning system 130 of FIG. 1 and, more specifically, of SDCM 132, during driving operations of the vehicle. In certain implementations, a single processing thread can perform method 700. Alternatively, two or more processing threads can perform method 700, each thread executing one or more individual functions, routines, subroutines, or operations of the method. In an illustrative example, the processing threads implementing method 700 can be synchronized (e.g., using semaphores, critical sections, and/or other thread synchronization mechanisms). Alternatively, the processing threads implementing method 700 can be executed asynchronously with respect to each other. Some operations of method 700 can be performed in a different order compared with the order shown in FIG. 7. Some operations of method 700 can be performed concurrently with other operations. Some operations can be optional.

At block 710, method 700 can include obtaining, using a sensing system of the vehicle, a first set of images and a second set of images. The first set of images can include one or more perspective camera images of an environment (e.g., camera images 202 in FIG. 3A). The second set of images can include one or more radar images of the environment (e.g., radar images 204 in FIG. 3A).

At block 720, method 700 can include generating, using a first neural network (e.g., camera network 220), one or more camera features (e.g., camera feature tensor 312) characterizing the first set of images. As illustrated with the callout block 722, generating the one or more camera features can include mapping the one or more camera features from a perspective coordinate system to a coordinate system associated with a ground surface (e.g., BEV grid 305 in FIG. 3A).

At block 730, method 700 can include generating, using a second neural network (e.g., radar network 222), one or more radar features (e.g., radar feature tensor 314) characterizing the second set of images.

At block 740, method 700 can include processing the one or more camera features and the one or more radar features to obtain an identification of one or more traffic signs in the environment. In some implementations, the identification of an individual traffic sign of the one or more traffic signs can include a determination of a location of the individual traffic sign, a type of the individual traffic sign, a value associated with a semantic content of the individual traffic sign, and/or a relevance of the individual traffic sign for the vehicle.

In some implementations, the one or more camera features being processed include a first camera feature associated with a first time (e.g., $FT_C(t_1)$), a second camera feature associated with a second time (e.g., $FT_C(t_2)$), and so on. The one or more radar features can similarly include a first radar feature associated with the first time (e.g., $FT_R(t_1)$), a second radar feature associated with the second time (e.g., $FT_R(t_2)$), and so on. In some implementations, processing the first/second/etc. camera features and the first/second/etc. radar features can be performed concurrently.

As illustrated with the bottom callout portion of FIG. 3A, processing the one or more camera features and the one or more radar features can include, at block 742, using a third neural network. In some implementations, the third neural network can include a backbone neural network (e.g., BEV backbone 224 in FIG. 3A and FIG. 3B) and one or more classification neural networks (e.g., sign classification heads 226-n in FIG. 3B). In some implementations, the first neural network, the second neural network, and the third neural network can be trained together, e.g., end-to-end.

In some implementations, method 700 can include, at block 744, obtaining a set of prospective traffic signs and, at block 746, eliminating one or more duplicate traffic signs from the set of prospective traffic signs (e.g., using filtering 360 in FIG. 3B) to obtain the identification of the one or more traffic signs.

In some implementations, method 700 can include processing, using a fourth neural network (e.g., auxiliary sign classification model 526), the one or more camera features to obtain an auxiliary identification of at least one traffic sign in the environment. Method 700 can then further include using the auxiliary identification as an additional input into the third NN.

In some implementations, the vehicle can be an autonomous vehicle, and method 700 can further include, at block 750, causing a driving control system of the autonomous vehicle to select a driving path of the autonomous vehicle in view of the identification of the one or more traffic signs.

FIG. 8 depicts a block diagram of an example computer device 800 capable of a training and/or deploying a sign detection and classification model that uses a combination of camera and radar images for accurate identification and reading of traffic signs in driving environments, in accordance with some implementations of the present disclosure. Example computer device 800 can be connected to other computer devices in a LAN, an intranet, an extranet, and/or the Internet. Computer device 800 can operate in the capacity of a server in a client-server network environment. Computer device 800 can be a personal computer (PC), a set-top box (STB), a server, a network router, switch or bridge, or any device capable of executing a set of instructions (sequential or otherwise) that specify actions to be taken by that device. Further, while only a single example computer device is illustrated, the term "computer" shall also be taken to include any collection of computers that individually or jointly execute a set (or multiple sets) of instructions to perform any one or more of the methods discussed herein.

Example computer device 800 can include a processing device 802 (also referred to as a processor or CPU), a main memory 804 (e.g., read-only memory (ROM), flash memory, dynamic random access memory (DRAM) such as synchronous DRAM (SDRAM), etc.), a static memory 806 (e.g., flash memory, static random access memory (SRAM), etc.), and a secondary memory (e.g., a data storage device 818), which can communicate with each other via a bus 830.

Processing device 802 (which can include processing logic 803) represents one or more general-purpose processing devices such as a microprocessor, central processing unit, or the like. More particularly, processing device 802 can be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 802 can also be one or more special-purpose processing devices such as an application specific integrated circuit (ASIC), a field programmable gate array (FPGA), a digital signal processor (DSP), network processor, or the like. In accordance with one or more aspects of the present disclosure, processing device 802 can be configured to execute instructions performing method 700 of deploying a sign detection and classification model that uses a combination of camera and radar images for accurate identification and reading of traffic signs in driving environments.

Example computer device 800 can further comprise a network interface device 808, which can be communicatively coupled to a network 820. Example computer device 800 can further comprise a video display 810 (e.g., a liquid crystal display (LCD), a touch screen, or a cathode ray tube (CRT)), an alphanumeric input device 812 (e.g., a keyboard), a cursor control device 814 (e.g., a mouse), and an acoustic signal generation device 816 (e.g., a speaker).

Data storage device 818 can include a computer-readable storage medium (or, more specifically, a non-transitory computer-readable storage medium) 828 on which is stored one or more sets of executable instructions 822. In accordance with one or more aspects of the present disclosure, executable instructions 822 can comprise executable instructions performing method 700 of deploying a sign detection and classification model that uses a combination of camera and radar images for accurate identification and reading of traffic signs in driving environments.

Executable instructions 822 can also reside, completely or at least partially, within main memory 804 and/or within processing device 802 during execution thereof by example computer device 800, main memory 804 and processing device 802 also constituting computer-readable storage media. Executable instructions 822 can further be transmitted or received over a network via network interface device 808.

While the computer-readable storage medium 828 is shown in FIG. 8 as a single medium, the term "computer-readable storage medium" should be taken to include a single medium or multiple media (e.g., a centralized or distributed database, and/or associated caches and servers) that store the one or more sets of operating instructions. The term "computer-readable storage medium" shall also be taken to include any medium that is capable of storing or encoding a set of instructions for execution by the machine that cause the machine to perform any one or more of the methods described herein. The term "computer-readable storage medium" shall accordingly be taken to include, but not be limited to, solid-state memories, and optical and magnetic media.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "identifying," "determining," "storing," "adjusting," "causing," "returning," "comparing," "creating," "stopping," "loading," "copying," "throwing," "replacing," "performing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Examples of the present disclosure also relate to an apparatus for performing the methods described herein. This apparatus can be specially constructed for the required purposes, or it can be a general purpose computer system selectively programmed by a computer program stored in the computer system. Such a computer program can be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The methods and displays presented herein are not inherently related to any particular computer or other apparatus. Various general purpose systems can be used with programs in accordance with the teachings herein, or it may prove convenient to construct a more specialized apparatus to perform the required method steps. The required structure for a variety of these systems will appear as set forth in the description below. In addition, the scope of the present disclosure is not limited to any particular programming language. It will be appreciated that a variety of programming languages can be used to implement the teachings of the present disclosure.

It is to be understood that the above description is intended to be illustrative, and not restrictive. Many other implementation examples will be apparent to those of skill in the art upon reading and understanding the above description. Although the present disclosure describes specific examples, it will be recognized that the systems and methods of the present disclosure are not limited to the examples described herein, but can be practiced with modifications within the scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

What is claimed is:

1. A system comprising:
a sensing system of a vehicle, the sensing system configured to acquire:
a set of camera images of an environment, and
a set of radar images of the environment;
a data processing system of the vehicle, the data processing system configured to:
generate, using a first neural network (NN), a set of camera features characterizing the set of camera images, each camera feature of the set of camera features generated for a respective pixel of a plurality of pixels of a coordinate system and for a respective time of a plurality of times;
generate, using a second NN, a set of radar features characterizing the set of radar images, each radar feature of the set of radar features generated for said respective pixel of the plurality of pixels of the coordinate system and said respective time of the plurality of times;
fuse the set of camera features with the set of radar features to obtain a fused tensor, where the fused tensor aggregates the set of camera features with the set of radar features (i) across pixels of the coordinate system and (ii) across multiple times of the plurality of times; and
process, using a third NN, the fused tensor, wherein an output of the third NN comprises semantic content of one or more traffic signs in the environment; and a driving control system of the vehicle, configured to:
control the vehicle based on the semantic content of the one or more traffic signs.

2. The system of claim 1, wherein the coordinate system is associated with a ground surface, and wherein to generate the set of camera features, the data processing system is configured to:
map the set of camera features from a perspective coordinate system to the coordinate system.

3. The system of claim 1, wherein the third NN comprises a backbone NN and one or more classification NNs.

4. The system of claim 1, wherein the data processing system is further configured to:
process, using a fourth NN, at least a subset of the set of camera features to obtain an auxiliary identification of at least one traffic sign in the environment; and
use the auxiliary identification as an additional input into the third NN.

5. The system of claim 1, wherein the first NN, the second NN, and the third NN are trained together.

6. The system of claim 1, wherein the semantic content of an individual traffic sign of the one or more traffic signs comprises a determination of one or more of:
a type of the individual traffic sign,
a value associated with a semantic content of the individual traffic sign, or
a relevance of the individual traffic sign for the vehicle; and
wherein the output of the third NN further comprises:
a location of the individual traffic sign.

7. The system of claim 1, wherein the data processing system is further configured to:
identify one or more duplicate traffic signs in the one or more traffic signs; and
eliminate the one or more duplicate traffic signs.

8. A method comprising:
obtaining, using a sensing system of a vehicle:
a set of camera images of an environment, and
a set of radar images of the environment;
generating, using a first neural network (NN), a set of camera features characterizing the set of camera images, each camera feature of the set of camera features generated for a respective pixel of a plurality of pixels of a coordinate system and for a respective time of a plurality of times,
generating, using a second NN, a set of radar features characterizing the set of radar images, each radar feature of the set of radar features generated for said respective pixel of the plurality of pixels of the coordinate system and said respective time of the plurality of times;
fusing the set of camera features with the set of radar features to obtain a fused tensor, where the fused tensor aggregates the set of camera features with the set of radar features (i) across pixels of the coordinate system and (ii) across multiple times of the plurality of times; and processing, using a third NN, the fused tensor, wherein an output of the third NN comprises semantic content of one or more traffic signs in the environment; and controlling the vehicle based on the semantic content of the one or more traffic signs.

9. The method of claim 8, wherein the coordinate system is associated with a ground surface, and wherein generating the one or more camera features comprises:

mapping the set of camera features from a perspective coordinate system to the coordinate system.

10. The method of claim 8, wherein the third NN comprises a backbone NN and one or more classification NNs.

11. The method of claim 8, further comprising:

processing, using a fourth NN, at least a subset of the set of camera features to obtain an auxiliary identification of at least one traffic sign in the environment; and using the auxiliary identification as an additional input into the third NN.

12. The method of claim 8, wherein the semantic content of an individual traffic sign of the one or more traffic signs comprises a determination of one or more of:

a type of the individual traffic sign, a value associated with a semantic content of the individual traffic sign, or a relevance of the individual traffic sign for the vehicle; and wherein the output of the third NN further comprises:

a location of the individual traffic sign.

13. The method of claim 8, further comprising:

identifying one or more duplicate traffic signs among the one or more traffic signs; and eliminating the one or more duplicate traffic signs.

14. An autonomous vehicle comprising:

one or more cameras configured to acquire a set of camera images of an environment;

one or more radar sensors configured to acquire a set of radar images of the environment;

a data processing system of the vehicle, the data processing system configured to:

generate, using a first neural network (NN), a set of camera features characterizing the set of camera images, each camera feature of the set of camera features generated for a respective pixel of a plurality of pixels of a coordinate system and for a respective time of a plurality of times;

generate, using a second NN, a set of radar features characterizing the set of radar images, each radar feature of the set of radar features generated for said respective pixel of the plurality of pixels of the coordinate system and said respective time of the plurality of times;

fuse the set of camera features with the set of radar features to obtain a fused tensor, where the fused tensor aggregates the set of camera features with the set of radar features (i) across pixels of the coordinate system and (ii) across multiple times of the plurality of times; and process, using a third NN, the fused tensor, wherein an output of the third NN comprises semantic content of one or more traffic signs in the environment; and an autonomous vehicle control system configured to:

cause the autonomous vehicle to follow a driving path selected in view of the semantic content of the one or more traffic signs.

* * * * *